United States Patent [19]

Bahl et al.

[11] Patent Number: 4,759,068
[45] Date of Patent: Jul. 19, 1988

[54] CONSTRUCTING MARKOV MODELS OF WORDS FROM MULTIPLE UTTERANCES

[75] Inventors: Lalit R. Bahl, Amawalk; Peter V. DeSouza; Robert L. Mercer, both of Yorktown Heights; Michael A. Picheny, White Plains, all of N.Y.

[73] Assignee: International Business Machines Corporation, Armonk, N.Y.

[21] Appl. No.: 738,933

[22] Filed: May 29, 1985

[51] Int. Cl.$^4$ ............................................. G10L 5/00
[52] U.S. Cl. ................................................. 381/43
[58] Field of Search ................................. 381/41–43; 364/513.5

[56] References Cited

U.S. PATENT DOCUMENTS

| | | | |
|---|---|---|---|
| 4,038,503 | 7/1977 | Moshier | 179/1 SA |
| 4,181,821 | 1/1980 | Pirz et al. | 179/1 SD |
| 4,319,085 | 3/1982 | Welch et al. | 179/1 SD |
| 4,348,553 | 9/1982 | Baker et al. | 179/1 SB |
| 4,481,593 | 11/1984 | Bahler | 364/513.5 |
| 4,513,436 | 5/1985 | Nose et al. | 381/43 |
| 4,587,670 | 5/1986 | Levinson et al. | 381/43 |
| 4,590,605 | 5/1986 | Hataoka et al. | 381/43 |
| 4,593,367 | 6/1986 | Slack et al. | 364/513 |
| 4,618,983 | 10/1986 | Nishioka et al. | 381/43 |

FOREIGN PATENT DOCUMENTS

0025685 3/1981 European Pat. Off. .
0033412 8/1981 European Pat. Off. .

OTHER PUBLICATIONS

M. Cravero et al. "Phonetic Units for Hidden Markov Models", CSELT Technical Reports, vol. XIV No. 2 Apr. 1986, pp. 121-125.
L. R. Rabiner et al., "Recent Developments in the Application of Hidden Markov Models to Speaker-Independent Isolated Word Recognition", AT&T 1985 article, p. 1214.
H. Boulard et al., "Speaker Dependent Connected Speech Recognition Via Phonemic Markov Models", 1985 IEEE, pp. 1213-1216.
Douglas E. Paul et al., "Training of HMM Recognizers by Simulated Annealing", 1985, IEEE, pp. 13-16.
Yves Kamp et al., "State Reduction in Hidden Markov Chains Used for Speech Recognition", 1985, IEEE, pp. 1138-1145.

(List continued on next page.)

Primary Examiner—Emanuel S. Kemeny
Attorney, Agent, or Firm—Marc A. Block

[57] ABSTRACT

Speech recognition is improved by splitting each feneme string at a consistent point into a left portion and a right portion. The present invention addresses the problem of constructing fenemic baseforms which take into account variations in pronunciation of words from one utterance thereof to another. Specifically, the invention relates to a method of constructing a fenemic baseform for a word in a vocabulary of word segments including the steps of: (a) transforming multiple utterances of the word into respective strings of fenemes; (b) defining a set of fenemic Markov model phone machines; (c) determining the best single phone machine $P_1$ for producing the multiple feneme strings; (d) determining the best two phone baseform of the form $P_1P_2$ or $P_2P_1$ for producing the multiple feneme strings; (e) aligning the best two phone baseform against each feneme string; (f) splitting each feneme string into a left portion and a right portion with the left portion corresponding to the first phone machine of the two phone baseform and the right portion corresponding to the second phone machine of the two phone baseform; (g) identifying each left portion as a left substring and each right portion as a right substring; (h) processing the set of left substrings and the set of right substrings in the same manner as the set of feneme strings corresponding to the multiple utterances including the further step of inhibiting further splitting of a substring when the single phone baseform thereof has a higher probability of producing the substring than does the best two phone baseform; and (k) concatenating the unsplit single phones in an order corresponding to the order of the feneme substrings to which they correspond.

13 Claims, 19 Drawing Sheets

OTHER PUBLICATIONS

"Isolated Word Recognition Using Hidden Markov Models", K. Sugawara, 1985, IEEE, pp. 1-4.

R. Schwartz, "Context-Dependent Modeling for Acoustic-Phonetic Recognition of Continuous Speech", 1985, IEEE, pp. 1205-1208.

J. F. Mari et al., "Speaker Independent Connected Digit Recognition Using Hidden Markov Models", 1985, Speech Tech, pp. 127-132.

R. Schwartz et al., "Improved Hidden Markov Modeling of Phonemes for Continuous Speech Recognition", 1984, IEEE, pp. 35.6.1-35.6.4.

S. E. Levinson et al., "Speaker Independent Isolated Digit Recognition Using Hidden Markov Models", 1983, IEEE, pp. 1049-1052.

Jean-Paul Haton et al., "Problems in the Design and Use of a Connected Speech Understanding System", 1982, IEEE, pp. 1616-1620.

D. M. Choy et al., "Speech Compression by Phoneme Recognition", 1982, IBM TDB, vol. 25, No. 6, pp. 2884-2886.

Bahl, et al., "Interpolation of Estimators Derived from Sparse Data", 1981, IBM TDB, vol. 24, No. 4, pp. 2038-2041.

Bahl, et al., "Faster Acoustic Match Computation", 1980, IBM TDB, vol. 23, No. 4, pp. 1718-1719.

Das, et al., "System for Temporal Registration of Quasi--Phonemic Utterance Representations", Dec., 1980, IBM TDB, vol. 23, No. 7A, pp. 3047-3050.

Bakis et al., "Continuous Speech Recognition Via Centisecond Acoustic States", Apr. 1976, Research Report, pp. 1-8.

Bakis et al., "Spoken Word Spotting Via Centisecond Acoustic States", Mar., 1976, IBM TDB, vol. 18, No. 10, pp. 3479-3481.

Itakura, "Minimum Prediction Residual Principle Applied to Speech Recognition" Feb., 1975, IEEE, pp. 145-150.

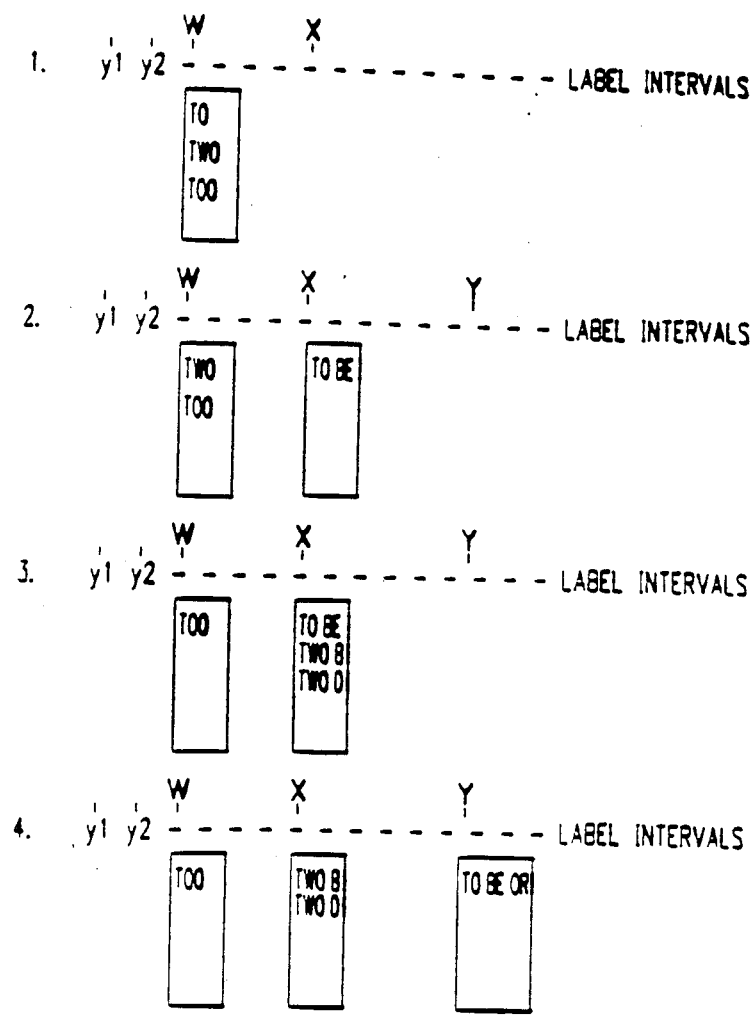

FREQUENCY IN CYCLES PER SECOND

PHONS

DETAILED MATCH LATTICE

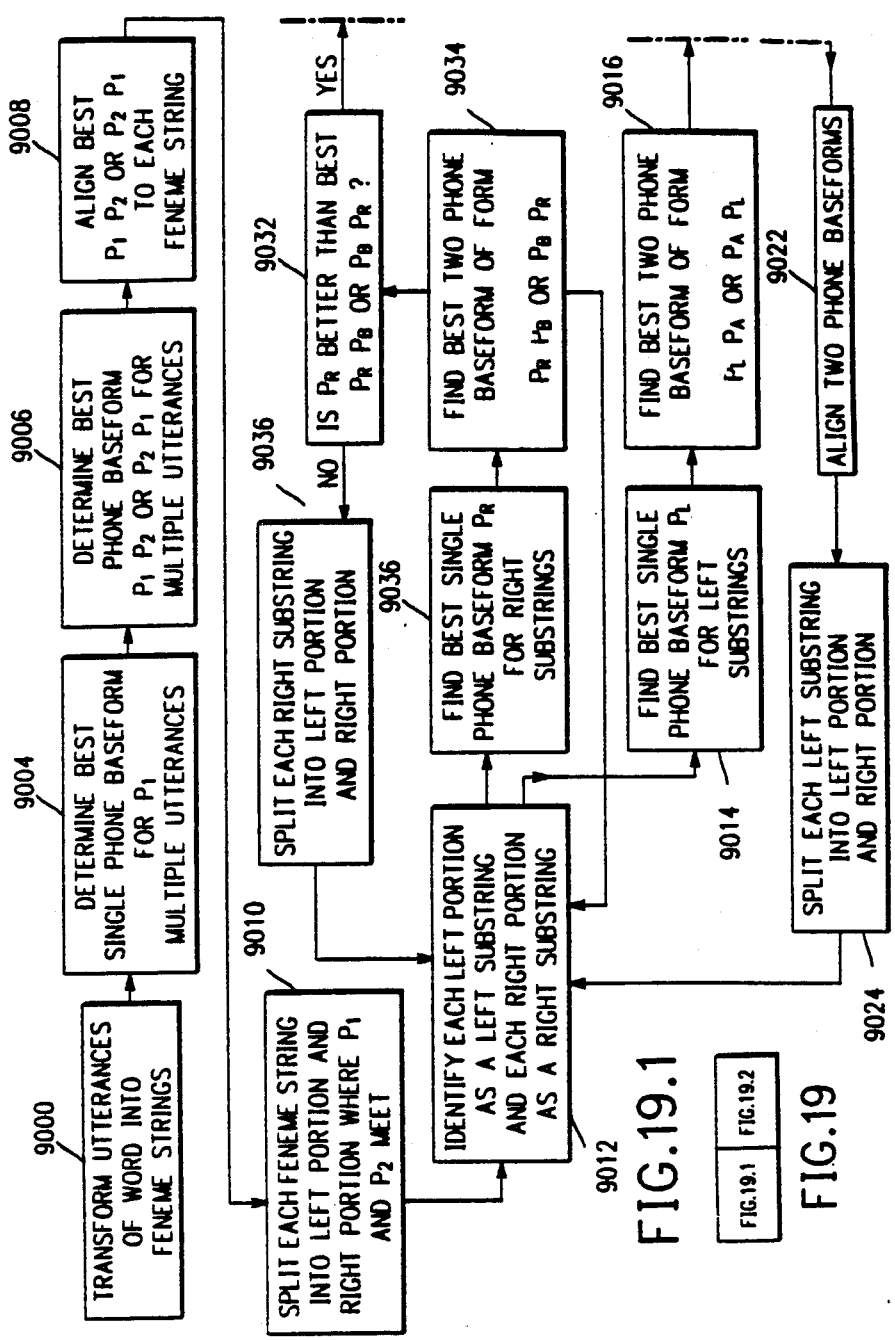

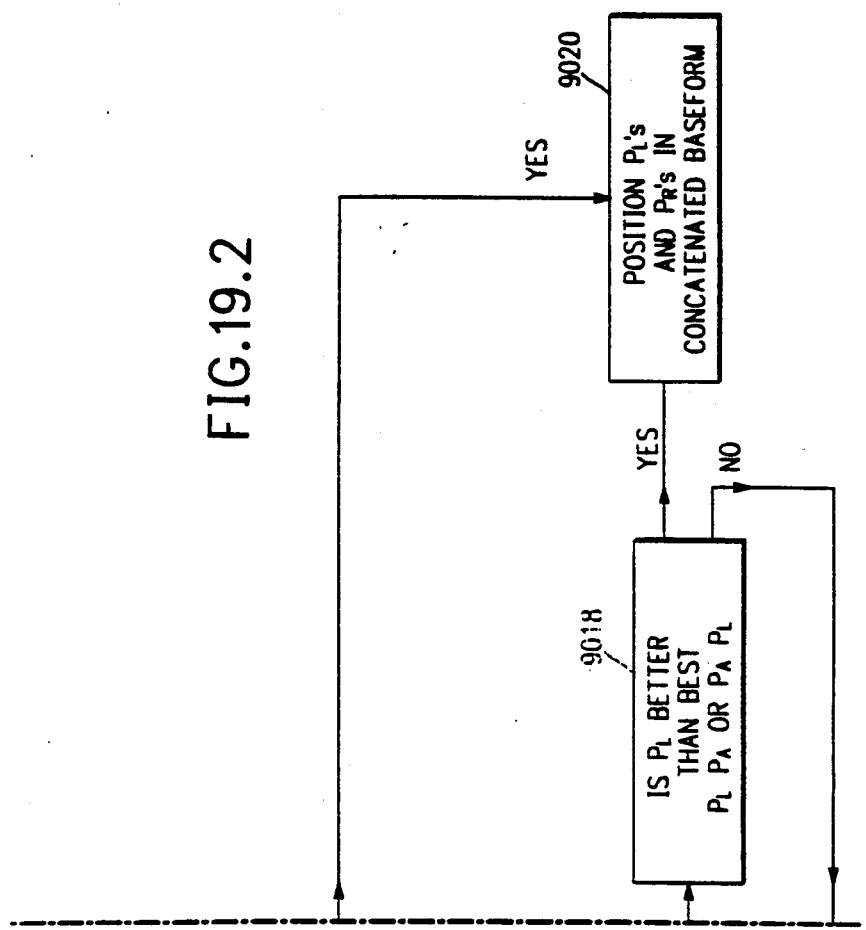

CONSTRUCTING MARKOV MODELS OF WORDS FROM MULTIPLE UTTERANCES

FIELD OF THE INVENTION

The present invention relates generally to the field of speech recognition and specifically to the constructing of baseforms in a speech recognition system.

DESCRIPTION OF PRIOR AND CONTEMPORANEOUS ART

The following cases relate to inventions which provide background or environment for the present invention: "Nonlinear Signal Processing in a Speech Recognition System", Ser. No. 06/665,401 filed Oct. 26, 1984; and "Feneme-Based Markov Models for Words", Ser. No. 06/697174 filed Feb. 1, 1985.

In some speech recognition systems, an acoustic processor receives speech as input and generates a string of "labels" thereto. The labels are selected by the acoustic processor from an alphabet, or set, of distinct labels based on some characteristic of the input speech.

Typically, an acoustic processor examines power spectral characteristics of speech input over centisecond intervals and assigns a label (referred to as a feneme) to each interval. In response to a speech input, the acoustic processor thus generates a corresponding string of fenemes.

In a probabilistic approach to speech recognition, a finite set of models is defined. Each model is a Markov model, or a probabilistic finite-state phone machine, which produces fenemes. This technique is discussed in articles such as "A Maximum Likelihood Approach to Continuous Speech Recognition", *IEEE Transactions on Pattern Analysis and Machine Intelligence*, volume PAMI-5, Number 2, March 1983, by L. R. Bahl, F. Jelinek, and R. L. Mercer.

In accordance with the probabilistic approach, each phone machine is characterized as having (a) a number of states, (b) transitions between states, each transition having a probability associated therewith, and (c), for each of at least some transitions, a plurality of output probabilities each representing the probability of producing a particular feneme thereat. A phone machine may include null transitions at which no feneme is produced. At non-null transitions, there is normally a probability assigned to each feneme in the alphabet.

After a speech input is transformed into a string of fenemes, a phone machine may be examined to determine the likelihood of the phone machine producing a substring of fenemes in the string. An examination may be performed for each phone to determine the respective likelihood of each phone machine producing the substring. Similarly, a sequence of phones may also be examined to determine the likelihood of the phones in the sequence producing the fenemes in the generated string.

Research efforts at the IBM Corporation have recognized various types of phone machines. One type is an "phonetic phone machine" which stores statistics that reflect the likelihood of a given phonetic element—when spoken—producing fenemes of a feneme string. Another type is a "fenemic phone machine" which stores statistics that reflect the likelihood of a given fenemic element—when spoken—producing fenemes of a feneme string.

A fenemic phone machine has two states, $S_1$ and $S_2$. One non-null transition is from $S_1$ to itself. A second non-null transition and a null transition extend between $S_1$ and $S_2$.

Each word in a vocabulary is represented by a predefined sequence of phones (or phone machines) referred to as a "word baseform". A fenemic baseform is a sequence of fenemic phones which are concatenated to represent a given word. A phonetic baseform is a sequence of phonetic phones which are concatenated to represent a given word.

The likelihood of a word being a match for the speech input is reflected by the probability of the baseform therefor producing the fenemes in the string. That is, the baseform having the highest probability of producing a string of fenemes represents the most closely matched word for the input speech.

How well a baseform corresponds to the word represented thereby is a significant factor affecting the accuracy achieved with the probabilistic approach.

One technique for determining the baseform for each word in the vocabulary is termed the singleton fenemic baseform technique. In this technique, each word is uttered once. Associated with each feneme, generated for the single utterance of the word is the phone machine with the highest probability of having produced the feneme.

In the singleton fenemic baseform technique, each phone machine is associated with a single feneme. For each generated feneme in the strings, there is thus one corresponding most probable phone machine. The sequence of phone machines corresponding to the utterance of a word represents of the word.

Several problems attend the singleton fenemic baseform technique. Utterances of a particular word may vary considerably. If the single utterance from which the baseform is constructed departs significantly from the pronunciation of the word at other times, the quality of the speech recognition may deteriorate.

To construct baseforms based on multiple utterances of each word, however, is not straightforward. In this regard, the phone sequence or baseform $B = P_1 P_2 - - - P_m$ (where $P_i$ is a phone) which has the highest joint probability for the multiple utterances is:

$$\prod_{i=1}^{N} Pr(B|f_{i1}f_{i2}f_{i3}\ldots f_{n i})$$

where $f_{i1} - - - f_{n_l i}$ is a feneme string for the ith utterance. Computing according to this expression is prohibitively expensive by all known methods.

SUMMARY OF THE INVENTION

The present invention improves over the singleton fenemic baseform technique by taking into account the possible variation in pronunciation of a word segment from one utterance thereof to another, where a word segment may be a conventional word or part thereof.

According to the present invention, each baseform is constructed based on multiple utterances of a corresponding word segment, employing a divide-and-conquer philosophy which enables baseforms to be constructed effectively and without severe time or computation requirements.

Specifically, one embodiment of the present invention includes the steps of (a) transforming multiple utterances of the word segment into respective strings of fenemes;

(b) defining a set of fenemic Markov model phone machines;
(c) determining the best single phone machine $P_1$ for producing the multiple feneme strings;
(d) determining the best two phone baseform of the form $P_1P_2$ or $P_2P_1$ for producing the multiple feneme strings;
(e) aligning the best two phone baseform against each feneme string;
(f) splitting each feneme string into a left portion and a right portion with the left portion corresponding to the first phone machine of the two phone baseform and the right portion corresponding to the second phone machine of the two phone baseform;
(g) identifying each left portion as a left substring and each right portion as a right substring;
(h) processing the set of left substrings in the same manner as the set of feneme strings corresponding to the multiple utterances including the further step of inhibiting further splitting of a substring when the single phone baseform thereof has a higher probability of producing the substring than does the best two phone baseform;
(j) processing the set of right substrings in the same manner as the set of feneme strings corresponding to the multiple utterances, including the further step of inhibiting splitting of a substring when the single phone baseform thereof has a higher probability of producing the substring than does the best two phone baseform; and
(k) concatenating the finally unsplit single phones in an order corresponding to the order of the feneme substrings to which they correspond.

The invention also provides for refining the basic baseform through an iterative process.

The invention also applies to baseforms constructed of phonetic phones or other types of phones as well.

BRIEF DESCRIPTION OF THE DRAWINGS

FIG. 4 is an illustration showing successive steps of stack decoding.

FIGS. 19, 19.1, 19.2 are a flowcharts illustrating a method of constructing a basic baseform for a word segment based on multiple utterances.

DESCRIPTION OF THE INVENTION

I. Description of Speech Recognition System Environment

Figure 1:
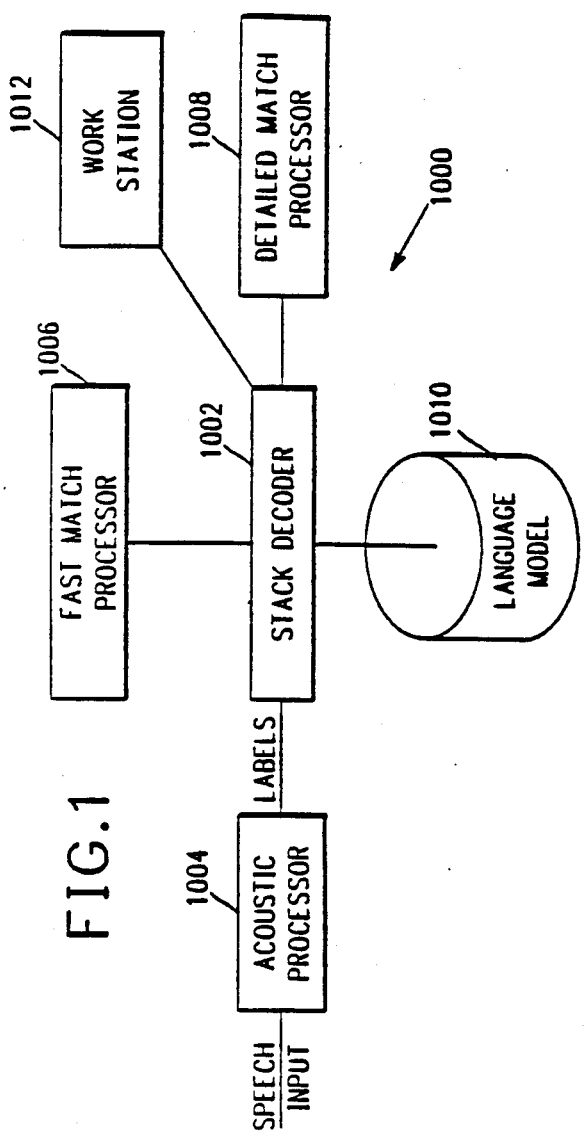
FIG. 1 is a general block diagram of a system environment in which the present invention may be practiced.

In FIG. 1, a general block diagram of a speech recognition system 1000 which provides an environment for the present invention is illustrated. The system 1000 includes a stack decoder 1002 to which are connected an acoustic processor (AP) 1004, an array processor 1006 used in performing a fast approximate acoustic match, an array processor 1008 used in performing a detailed acoustic match, a language model 1010, and a word station 1012.

The acoustic processor 1004 is designed to transform a speech waveform input into a string of labels, or fenemes, each of which in a general sense identifies a corresponding sound type. The sound types are typically defined by a clustering algorithm which may reflect Gaussian or some other distribution relating to spectral energy or some other characteristic. In the present system, the acoustic processor 1004 is based on a unique model of the human ear and is described in the above-mentioned application entitled "Nonlinear Signal Processing in a Speech Recognition System."

Figure 2:
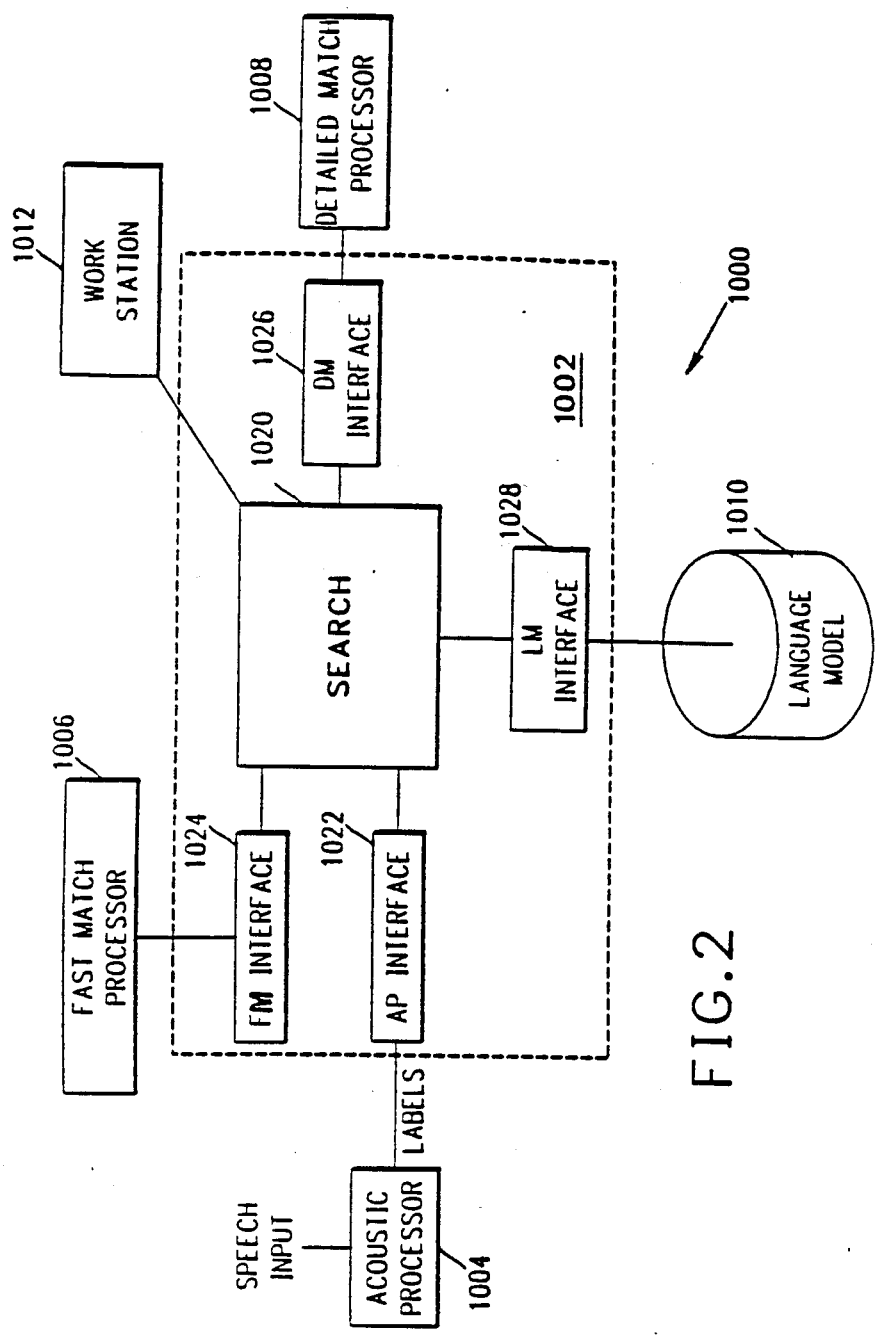
FIG. 2 is a block diagram of the system environment of FIG. 1, wherein the stack decoder is shown in greater detail.

The labels, or fenemes, from the acoustic processor 1004 enter the stack decoder 1002. In a logical sense, the stack decoder 1002 may be represented by the elements shown in FIG. 2. That is, the stack decoder 1002 includes a search element 1020 which communicates with the work station 1012 and which communicates with the acoustic processor process, the fast match processor process, the detailed match process, and the language model process through respective interfaces 1022, 1024, 1026, and 1028.

In the system shown in FIG. 1, fenemes from the acoustic processor 1004 are directed by the search element 1020 to the fast match processor 1006. The fast match processor 1006 is designed to examine words in a vocabulary of words and to reduce the number of candidate words for a given string of incoming labels. The fast match is based on probabilistic finite state machines, also referred to herein as Markov model phone machines.

Preferably, the detailed match examines those words from the fast match candidate list which have a reasonable likelihood of being the spoken word based on the language model computations.

Alternatively, the detailed match may be applied to each word in the vocabulary, in which event the fast match is omitted. The detailed match is performed by means of Markov model phone machines such as that illustrated in FIG. 3, when the phones are of the phonetic type.

After the detailed match, the language model is, preferably, again invoked to determine word likelihood.

The fast match, language model, detailed match, and language model procedure should be recognized as one system which can exploit the present invention. A system including only a detailed match—for phonetic, fenemic, or other phone types—may likewise employ the invention.

The purpose of the stack decoder 1004 is to determine a word string W that has the highest probability of having produced the string of labels $y_1 y_2 y_3 \cdots$.

Mathematically, this is represented by the expression:

$$Max(Pr(W|Y)). \tag{1}$$

the maximum probability of W given Y over all word strings W. As is well known, the probability $Pr(W|Y)$ can be written as:

$$Pr(W|Y) = Pr(W) \times Pr(Y|W)/Pr(Y) \tag{2}$$

where $Pr(Y)$ is independent of W.

One approach to determining the most likely path (or sequence) of successive words W* is to look at each possible path and determine the probability of each such path producing the string of labels that is being decoded. The path having the highest probability associated therewith is then selected. With a 5000 word vocabulary, this approach becomes unwieldy, especially when the sequence of words is lengthy.

Two other commonly known approaches for finding the most likely word sequence W* are Viterbi decoding and stack decoding. Each of these techniques are described in the above-cited article entitled "A Maximum Likelihood Approach to Continuous Speech Recognition" at sections V and VI respectively.

The stack decoding technique in the article relates to single stack decoding. That is, paths of varying length are listed in a single stack according to likelihood and decoding is based on the single stack. Single stack decoding must account for the fact that likelihood is somewhat dependent on path length and, hence, normalization is generally employed. Normalization, however, can result in excessive searching and search errors due to inadequate searching if the normalization factor is not properly estimated.

The Viterbi technique, while not requiring normalization, is generally practical for only small tasks. In large vocabulary applications, the Viterbi algorithm which is basically time synchronous may have to be interfaced with an acoustic matching component which is asynchronous. In this event, the resulting interface is not neat.

Figure 5:
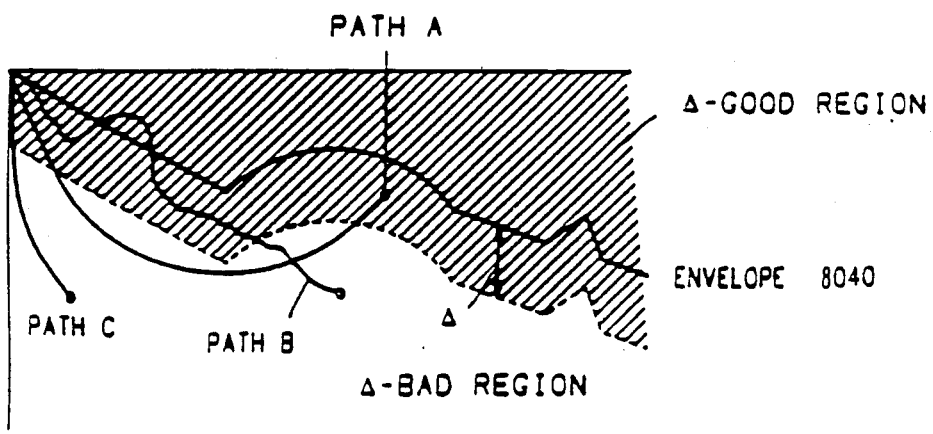
FIG. 5 is a graph illustrating a stack decoding technique.
Figure 6:
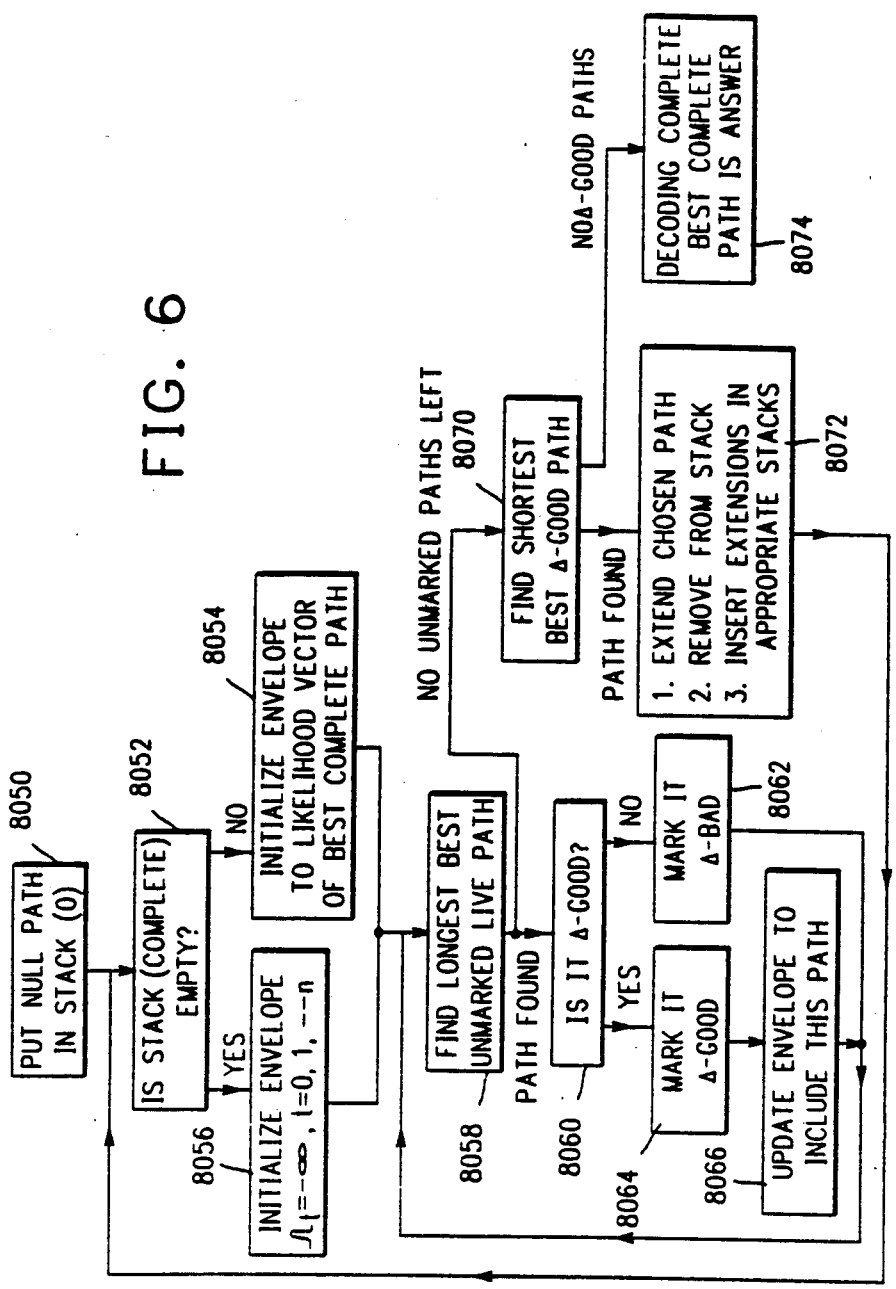
FIG. 6 is a flowchart showing a stack decoding technique.

An alternative novel apparatus and methodology invented by L. R. Bahl, F. Jelinek, and R. L. Mercer relates to methodology whereby the most probable word sequence W* can be decoded with low computational requirements and high accuracy relative to other techniques. Specifically, a technique is provided which features multi-stack decoding and a unique decision strategy to determine which sequence of words should be extended at a given time. In accordance with the decision strategy, a path of relatively short length is not penalized because of its shortness but is, instead, judged on its relative likelihood. The novel apparatus and methodology are illustrated in FIGS. 4, 5, and 6 and are discussed hereinbelow in greater detail.

The stack decoder 1002, in effect, serves to control the other elements but does not perform many computations. Hence, the stack decoder 1002 preferably includes a 4341 running under the IBM VM/370 operating system (Model 155, VS2, Release 1.7). The acoustic match components which perform considerable computation have been implemented with Floating Point System (FPS) 190L's, which are commercially available.

Figure 7:
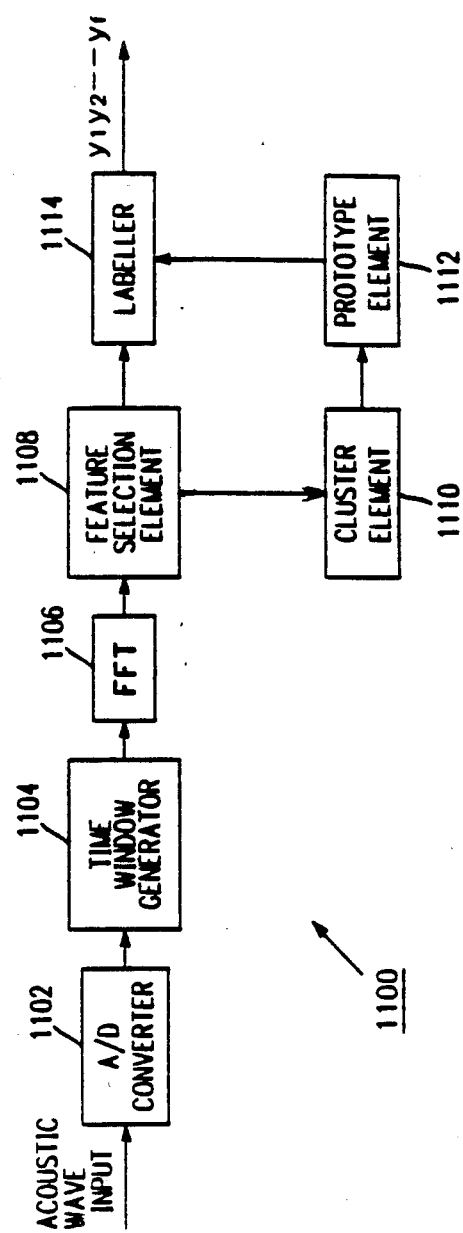
FIG. 7 is an illustration depicting the elements of an acoustic processor.

The Auditory Model and Implementation Thereof In An Acoustic Processor Of a Speech Recognition System In FIG. 7, a specific embodiment of an acoustic processor 1100, as described above, is illustrated. An acoustic wave input (e.g., natural speech) enters an analog-to-digital converter 1102 which samples at a prescribed rate. A typical sampling rate is one sample every 50 micro-seconds. To shape the edges of the digital signal, a time window generator 1104 is provided. The output of the window 1104 enters a fast Fourier transform (FFT) element 1106 which provides a frequency spectrum output for each time window.

The output of the FFT element 1106 is then processed to produce labels $L_1 L_2 - L_f$. Four elements—a feature selection element 1108, a cluster element 1110, a prototype element 1112, and a labeller 1114—coact to generate the labels. In generating the labels, prototypes are defined as points (or vectors) in the space based on selected features. Acoustic inputs are then characterized by the same selected features to provide corresponding points (or vectors) in space that can be compared to the prototypes.

Specifically, in defining the prototypes, sets of points are grouped together in clusters by element 1110. Methods for defining clusters have been based on probability distributions—such as a Gaussian distribution—applied to speech. The prototype of each cluster—relating to the centroid or other characteristic of the cluster—is generated by the prototype element 1112. The generated prototypes and acoustic input—both characterized by the same selected features—enter the labeller 1114. The labeller 1114 performs a comparing procedure which results in assigning a label to a particular acoustic input.

The selection of appropriate features is a key factor in deriving labels which represent the acoustic (speech) wave input. The acoustic processor relates to an improved feature selection element 1008. In accordance with the acoustic processor, a unique auditory model is derived and applied. In explaining the auditory model, reference is made to FIG. 8.

Figure 8:
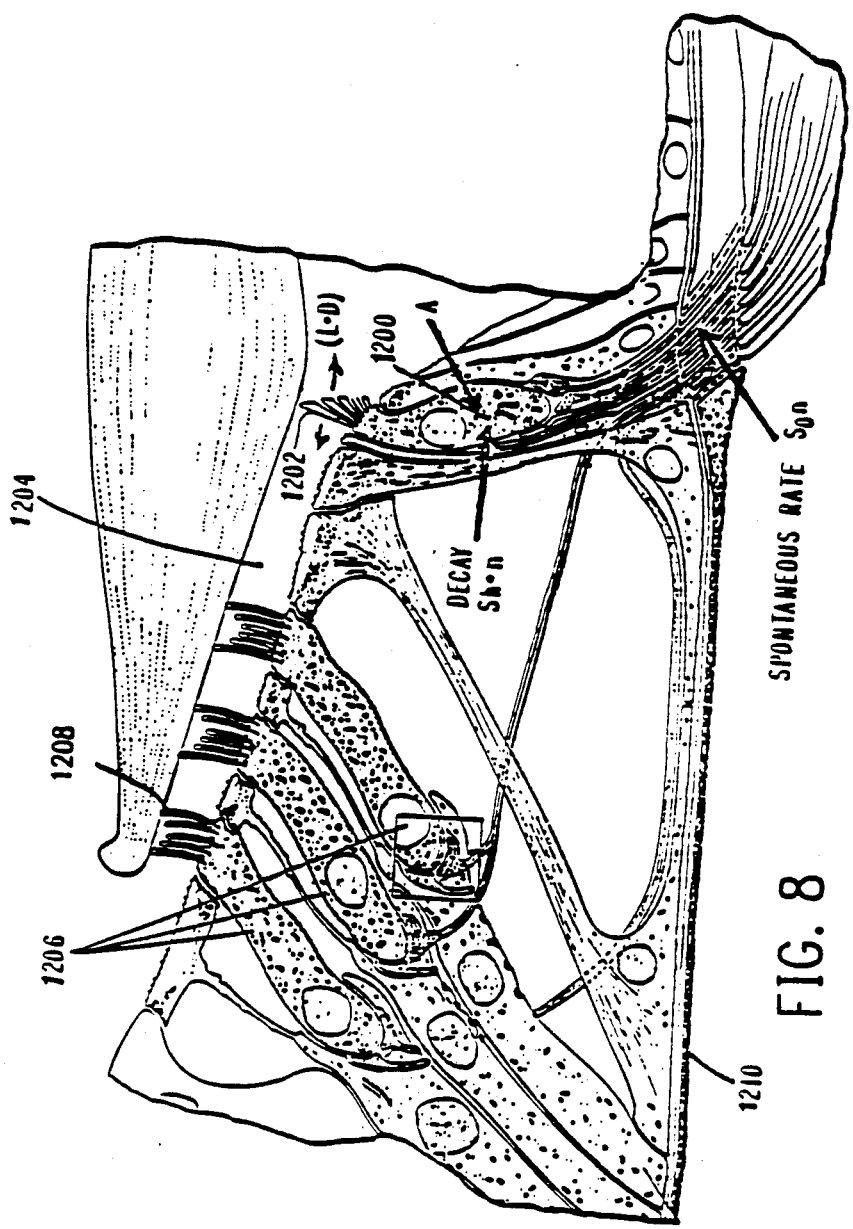
FIG. 8 is an illustration of a typical human ear indicating where components of an acoustic model are defined.

FIG. 8 shows part of the inner human ear. Specifically, an inner hair cell 1200 is shown with end portions 1202 extending therefrom into a fluid-containing channel 1204. Upstream from inner hair cells are outer hair cells 1206 also shown with end portions 1208 extending into the channel 1204. Associated with the inner hair cell 1200 and outer hair cells 1206 are nerves which convey information to the brain for processing. Effectuation of the electrochemical changes is stimulated by the mechanical motion of the basilar membrane 1210.

It has been recognized, in prior teachings, that the basilar membrane 1210 serves as a frequency analyzer for acoustic waveform inputs and that portions along the basilar membrane 1210 respond to respective critical frequency bands. That different portions of the basilar membrane 1210 respond to corresponding frequency bands has an impact on the loudness perceived for an acoustic waveform input. That is, the loudness of tones is perceived to be greater when two tones are in different critical frequency bands than when two tones of similar power intensity occupy the same frequency band. In has been found that there are on the order of twenty-two critical frequency band defined by the basilar membrane 1210.

Conforming to the frequency-response of the basilar membrane 1210, the present acoustic processor 1100 in its preferred form physically defines the acoustic waveform input into some or all of the critical frequency bands and then examines the signal component for each defined critical frequency band separately. This function is achieved by appropriately filtering the signal from the FFT element 1106 (see FIG. 7) to provide a separate signal in the feature selection element 1108 for each examined critical frequency band.

The separate inputs, it is noted, have also been blocked into time frames (of preferably 25.6 msec) by the time window generator 1104. Hence, the feature selection element 1108 preferably includes twenty-two signals—each of which represents sound intensity in a given frequency band for one frame in time after another.

Figure 9:
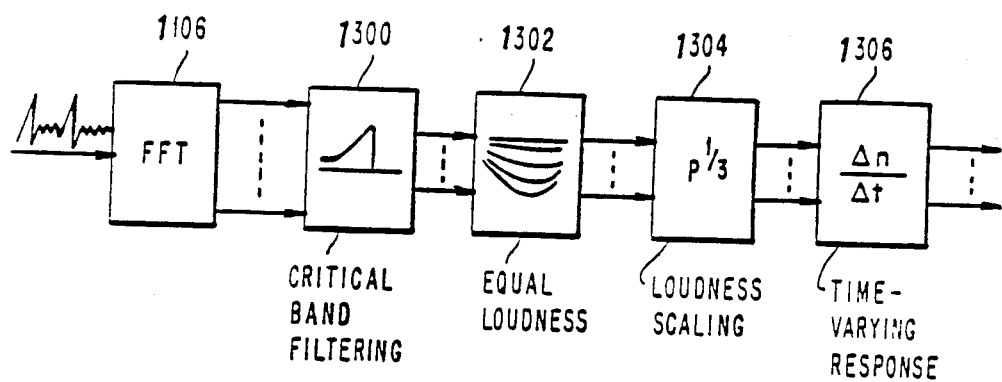
FIG. 9 is a block diagram showing portions of the acoustic processor.
Figure 10:
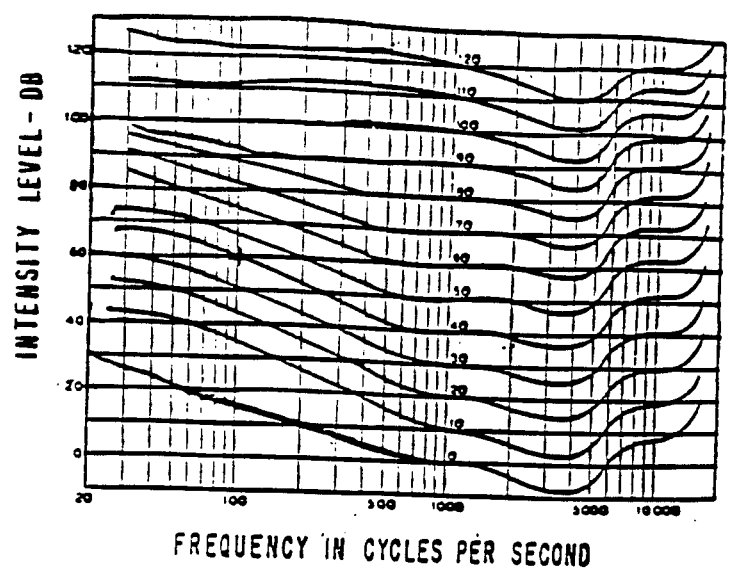
FIG. 10 is a graph showing sound intensity versus frequency, the graph being used in the design of the acoustic processor.

The filtering is preferably performed by a conventional critical band filter 1300 of FIG. 9. The separate signals are then processed by an equal loudness converter 1302 which accounts for perceived loudness variations as a function of frequency. In this regard, it is noted that a first tone at a given dB level at one frequency may differ in perceived loudness from a second tone at the same given dB level at a second frequency. The converter 1302 can be based on empirical data, converting the signals in the various frequency bands so that each is measured by a similar loudness scale. For example, the converter 1302 preferably map from acoustic power to equal loudness based on studies of Fletcher and Munson in 1933, subject to certain modifications. The modified results of these studies are depicted in FIG. 10. In accordance with FIG. 10, a 1 KHz tone at 40 dB is comparable in loudness level to a 100 Hz tone at 60 dB as shown by the X in the figure.

The converter 1302 adjusts loudness preferably in accordance with the contours of FIG. 10 to effect equal loudness regardless of frequency.

In addition to dependence on frequency, power changes and loudness changes do not correspond as one looks at a single frequency in FIG. 10. That is, variations in the sound intensity, or amplitude, are not at all points reflected by similar changes in perceived loudness. For example, at 100 Hz, the perceived change in loudness of a 10 dB change at about 110 dB is much larger than the perceived change in loudness of a 10 dB change at 20 dB. This difference is addressed by a loudness scaling element 1304 which compresses loudness in a predefined fashion. Preferably, the loudness scaling element compresses power P by a cube-root factor to $p^{\frac{1}{3}}$ by replacing loudness amplitude measure in phons by sones.

Figure 11:
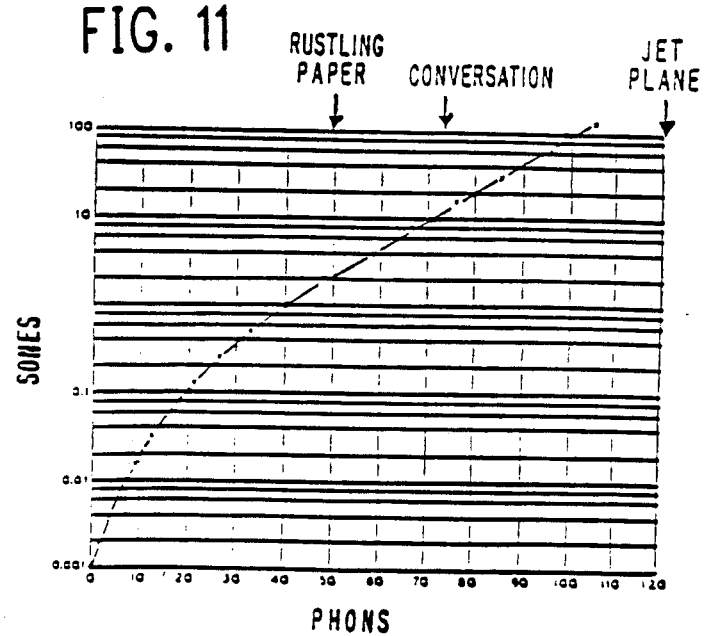
FIG. 11 is a graph showing the relationship between sones and phones.

FIG. 11 illustrates a known representation of phons versus sones determined empirically. By employing sones, the present model remains substantially accurate at large speech signal amplitudes. One sone, it should be recognized, has been defined as the loudness of a 1 KHz tone at 40 dB.

Referring again to FIG. 9, a novel time varying response element 1306 is shown which acts on the equal loudness, loudness scaled signals associated with each critical frequency band. Specifically, for each frequency band examined, a neural firing rate f is determined at each time frame. The firing rate f is defined in accordance with the present acoustic processor as:

$$f=(So+DL)n \quad (1)$$

where n is an amount of neurotransmitter; So is a spontaneous firing constant which relates to neural firings independent of acoustic waveform input; L is a measurement of loudness; and D is a displacement constant. So×n corresponds to the spontaneous neural firing rate which occurs whether or not there is an acoustic wave input and DLn corresponds to the firing rate due to the acoustic wave input.

Significantly, the value of n is characterized by the present invention as changing over time according to the relationship:

$$dn/dt=Ao-(So+Sh+DL)n \quad (2)$$

where Ao is a replenishment constant and Sh is a spontaneous neurotransmitter decay constant. The novel relationship set forth in equation (2) takes into account that neurotransmitter is being produced at a certain rate (Ao) and is lost (a) through decay (Sh×n), (b) through spontaneous firing (So×n), and (c) through neural firing due to acoustic wave input (DL×n). The presumed locations of these modelled phenomena are illustrated in FIG. 8.

Equation (2) also reflects the fact that the present invention is non-linear in that the next amount of neurotransmitter and the next firing rate are dependent multiplicatively on the current conditions of at least the neurotransmitter amount. That is, the amount of neurotransmitter at a state (t+Δt) is equal to the amount of neurotransmitter at a state t plus dn/dtΔt, or:

$$n(t+\Delta t)=n(t)+(dn/dt)\Delta t \quad (3)$$

Equations (1), (2), and (3) describe a time varying signal analyzer which, it is suggested, addresses the fact that the auditory system appears to be adaptive over time, causing signals on the auditory nerve to be non-linearly related to acoustic wave input. In this regard, the present invention provides the first model which embodies non-linear signal processing in a speech recognition system, so as to better conform to apparent time variations in the nervous system.

In order to reduce the number of unknowns in equations (1) and (2), the present invention uses the following equation (4) which applied to fixed loudness L:

$$So + Sh + DL = 1/T \qquad (4)$$

T is a measure of the time it takes for an auditory response to drop to 37% of its maximum after an audio wave input is generated. T, it is noted, is a function of loudness and is, according to the invention, derived from existing graphs which display the decay of the response for various loudness levels. That is, when a tone of fixed loudness is generated, it generates a response at a first high level after which the response decays toward a steady condition level with a time constant T. With no acoustic wave input, $T = T_0$ which is on the order of 50 msec. For a loudness of $L_{max}$, $T = T_{max}$ which is on the order of 30 msec. By setting $A_0 = 1$, $1/(So + Sh)$ is determined to be 5 csec, when $L = 0$. When L is $L_{max}$ and $L_{max} = 20$ sones, equation (5) results:

$$So + Sn + D(20) = 1/30 \qquad (5)$$

With the above data and equations, So and Sh are defined by equations (6) and (7) as:

$$So = DL_{max}/(R + (DL_{max}T_oR) - 1) \qquad (6)$$

$$Sh = 1/T_o - So \qquad (7)$$

where $$R = \frac{f_{steady\ state}\ |\ L_{max}}{f_{steady\ state}\ |\ L = 0} \qquad (8)$$

$f_{steady\ state}$ represents the firing rate at a given loudness when dn/dt is zero.

R, it is noted, is the only variable left in the acoustic processor. Hence, to alter the performance of the processor, only R is changed. R, that is, is a single parameter which may be adjusted to alter performance which, normally, means minimizing steady state effects relative to transient effects. It is desired to minimize steady state effects because inconsistent output patterns for similar speech inputs generally result from differences in frequency response, speaker differences, background noise, and distortion which affect the steady state portions of the speech signal but not the transient portions. The value of R is preferably set by optimizing the error rate of the complete speech recognition system. A suitable value found in this way is R = 1.5. Values of So and Sh are then 0.0888 and 0.11111 respectively, with D being derived as 0.00666.

Figure 12:
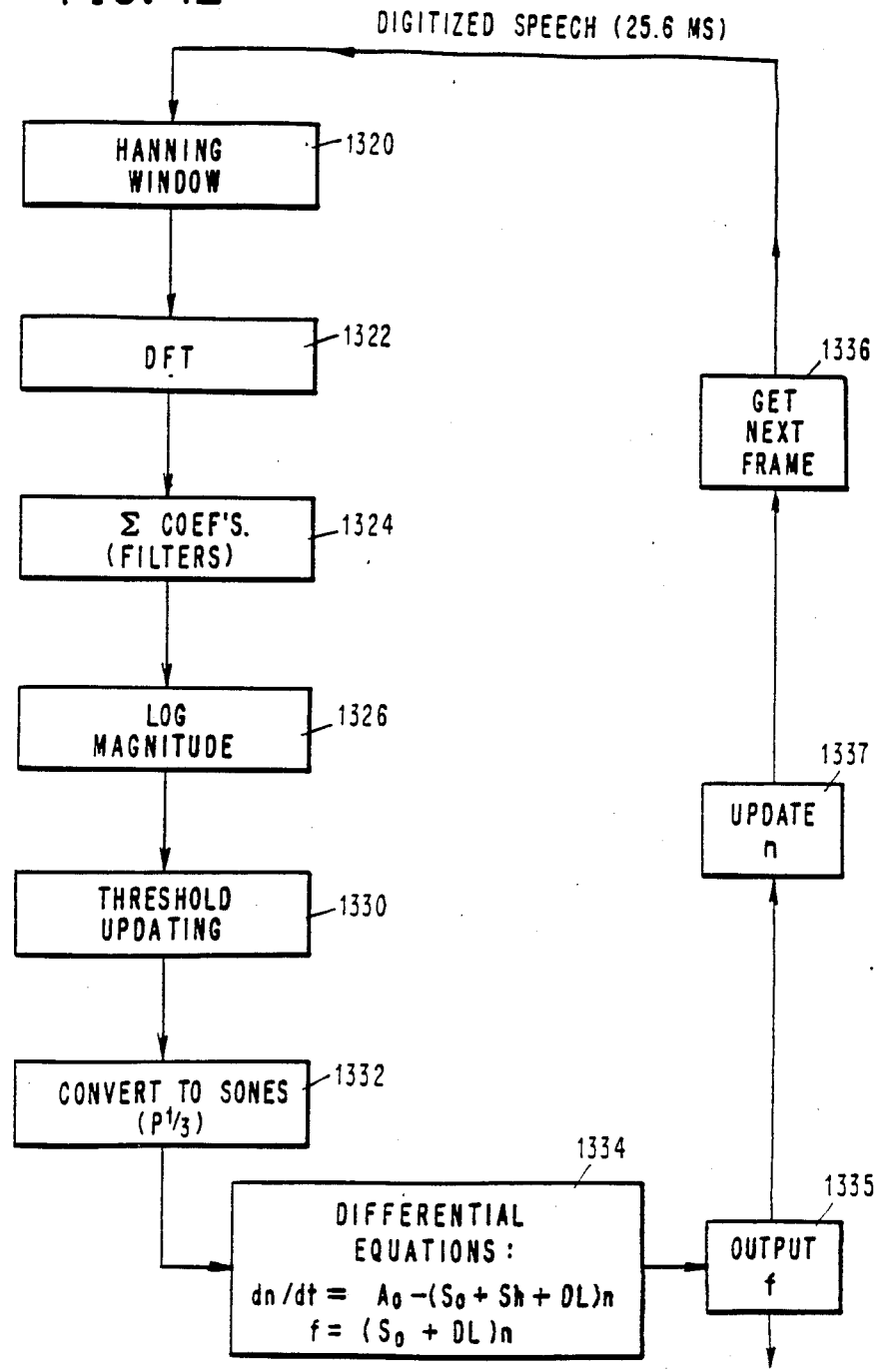
FIG. 12 is a flowchart representation showing how sound is characterized according to the acoustic processor of FIG. 7.

Referring to FIG. 12, a flowchart of the present acoustic processor is depicted. Digitized speech in a 25.6 msec time frame, sampled at preferably 20 KHz passes through a Hanning Window 1320 the output from which is subject to a Dual Fourier Transform 1322, taken at preferably 10 msec intervals. The transform output is filtered by element 1324 to provide a power density output for each of at lest one frequency band—preferably all the critical frequency bands or at least twenty thereof. The power density is then transformed from log magnitude 1326 to loudness level. This is performed either by the modified graph of FIG. 10 or based on threshold derived by the process outlined hereafter and depicted in FIG. 13.

Figure 13:
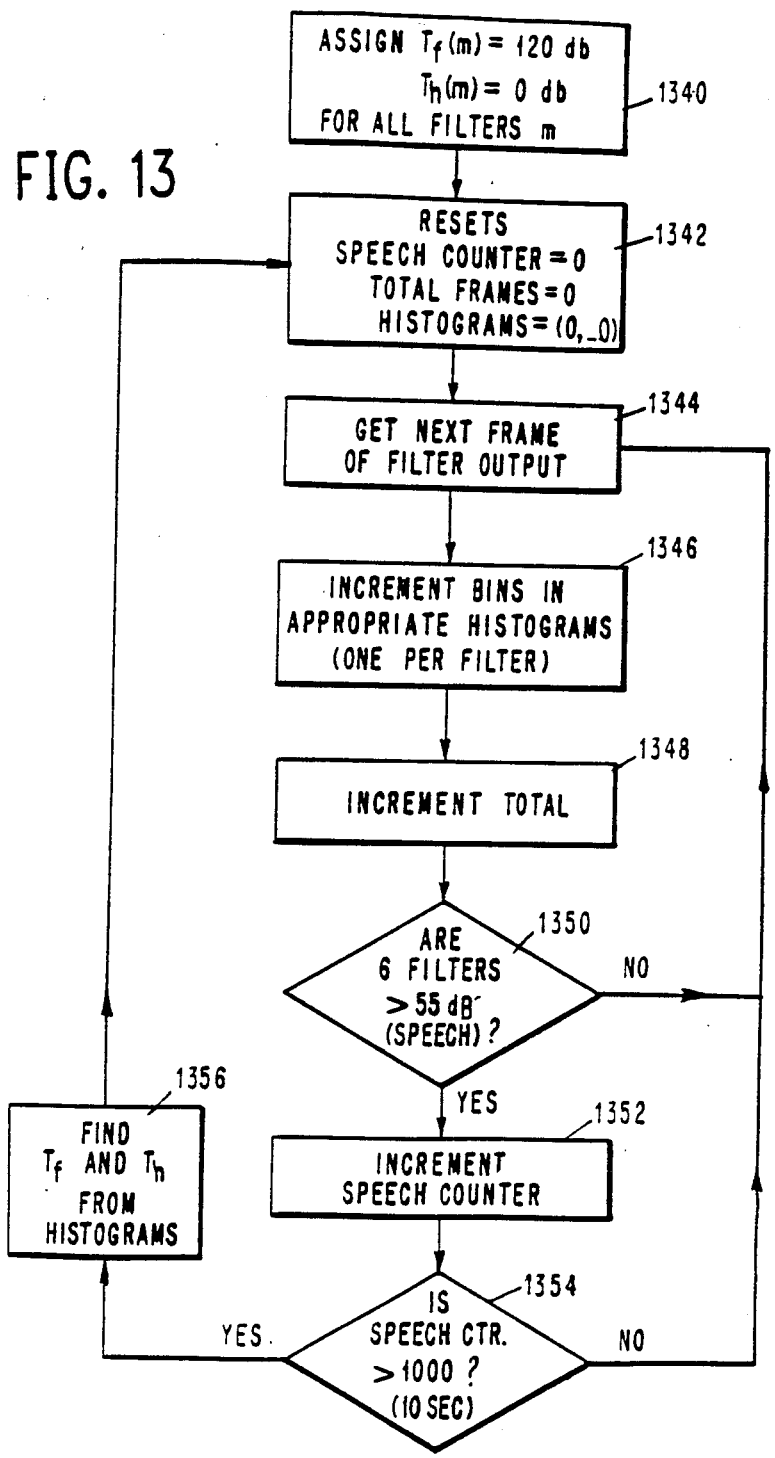
FIG. 13 is a flowchart representation showing how thresholds are updated in FIG. 12.

In FIG. 13, a threshold-of-feeling $T_f$ and a threshold-of-hearing $T_h$ are initially defined (at step 1340) for each filtered frequency band m to be 120 dB and 0 dB respectively. Thereafter, a speech counter, total frames register, and a histogram register are reset at step 1342.

Each histogram includes bins, each of which indicates the number of samples or counts during which power or some similar measure—in a given frequency band—is in a respective range. A histogram in the present instance preferably represents—for each given frequency band—the number of centiseconds during which loudness is in each of a plurality of loudness ranges. For example, in the third frequency band, there may be twenty centiseconds between 10 dB and 20 dB in power. Similarly, in the twentieth frequency band, there may be one hundred fifty out of a total of one thousand centiseconds between 50 dB and 60 dB. From the total number of samples (or centiseconds) and the counts contained in the bins, percentiles are derived.

A frame from the filter output of a respective frequency band is examined at step 1344 and bins in the appropriate histograms—one per filter—are incremented at step 1346. The total number of bins in which the amplitude exceeds 55 dB are summed for each filter (i.e., frequency band) at step 1348 and the number of filters indicating the presence of speech is determined. If there is not a minimum of filters (e.g. six of twenty) to suggest speech, the next frame is examined at step 1344. If there are enough filters to indicate speech at step 1350, a speech counter is incremented at step 1352. The speech counter is incremented at step 1352 until 10 seconds of speech have occurred at step 1354 whereupon new values for $T_f$ and $T_h$ are defined for each filter at step 1356.

The new $T_f$ and $T_h$ values are determined for a given filter as follows. For $T_f$, the dB value of the bin holding the 35th sample from the top of 1000 bins (i.e. the 96.5th percentile of speech) is defined as $BIN_H$. $T_f$ is then set as: $T_f = BIN_H + 40$ dB. For $T_h$, the dB value of the bin holding the (0.01) (TOTAL BINS−SPEECH COUNT) the value from the lowest bin is defined as $BIN_L$. That is, $BIN_L$ is the bin in the histogram which is 1% of the number of samples in the histogram excluding the number of samples classified as speech. $T_h$ is then defined as: $T_h = BIN_L 30$ dB.

Returning to FIG. 12, the sound amplitudes are converted to sones and scaled based on the updated thresholds (steps 1330 and 1332) as described hereinbefore. An alternative method of deriving sones and scaling is by taking the filter amplitudes "a" (after the bins have been incremented) and converting to dB according to the expression:

$$a^{dB} = 20\log_{10}(a) - 10 \qquad (9)$$

Each filter amplitude is then scaled to a range between 0 and 120 dB to provide equal loudness according to the expression:

$$a^{eql} = 120(a^{dB} - T_h)/(T_f - T_h) \qquad (10)$$

$a^{eql}$ is then preferably converted from a loudness level (phons) to an approximation of loudness in sones (with a 1 KHz signal at 40 dB mapping to 1) by the expression:

$$L^{dB} = (a^{eql} - 30)/4 \quad (11)$$

Loudness in sones is then approximated as:

$$L_s(appr) = 10(L^{dB})/20 \quad (12)$$

The loudness in sones $L_s$ is then provided as input to the equations (1) and (2) at step 1334 to determine the output firing rate f for each frequency band. With twenty-two frequency bands, a twenty-two dimension vector characterizes the acoustic wave inputs over successive time frames. Generally, however, twenty frequency bands are examined by employing a conventional mel-scaled filter bank.

Prior to processing the next time frame, the next state of n is determined in accordance with equation (3) in step 1337.

The acoustic processor hereinbefore described is subject to improvement in applications where the firing rate f and neurotransmitter amount n have large DC pedestals. That is, where the dynamic range of the terms of the f and n equations is important, the following equations are derived to reduce the pedestal height.

In the steady state, and in the absence of an acoustic wave input signal (L=0), equation (2) can be solved for a steady-state internal state n':

$$n = A/(So + Sh) \quad (13)$$

The internal state of the neurotransmitter amount n(t) can be represented as a steady state portion and a varying portion:

$$n(t) = n' + n''(t) \quad (14)$$

Combining equations (1) and (14), the following expression for the firing rate results;

$$f(t) = (So + D \times L)(n' + n''(t)) \quad (15)$$

The term $So \times n'$ is a constant, while all other terms include either the varying part of n or the input signal represented by $(D \times L)$. Future processing will involve only the squared difference between output vectors, so that constant terms may be disregarded. Including equation (13) for n', we get $$f'(t) = (So + D \times L) \times ((n''(t) + D \times L \times A)/(So + Sh) \quad (16)$$

Considering equation (3), the next state becomes;

$$n(t + \Delta t) = n'(t + \Delta t) + n''(t + \Delta t) \quad (17)$$

$$= n''(t) + A - (So + Sh + D \times L) \times (n' + n''(t)) \quad (18)$$

$$= n''(t) - (Sh \times n''(t) - (So + Ao \times L^A)n''(t) - \quad (19)$$

$$(Ao \times L^A \times D)/(So + Ao\ Sh) + Ao -$$

$$(So \times Ao) + ((Sh \times Ao) + (Sh \times Ao/(So + Sh))$$

This equation (19) may be rewritten, ignoring all constant terms, as:

$$n''(t + \Delta t) = n''(t)(1 - So\Delta t) - f'(t) \quad (20)$$

Equations (15) and (20) now constitute the output equations and state-update equations applied to each filter during each 10 millisecond time frame. The result of applying these equations is a 10 element vector each 10 milliseconds, each element of the vector corresponding to a firing rate for a respective frequency band in the mel-scaled filter bank.

With respect to the embodiment set forth immediately hereinabove, the flowchart of FIG. 17 applies except that the equations for f, dn/dt, and n(t+1) are replaced by equations (11) and (16) which define special case expressions for firing rate f and next state n $(t + \Delta t)$ respectively.

It is to be noted that the values attributed to the terms in the various equations (namely $t_o = 5$ csec, $t_L = 3$ csec, $Ao = 1$, $R = 1.5$, and $L_{max} = (20)$ may be set otherwise and the terms So, Sh, and D may differ from the preferable reviewed values of 0.0888, 0.111111, and 0.00666, respectively, as other terms are set differently.

The present acoustic model has been practiced using the PL/I programming language with Floating Point Systems FPS 190L hardware, however, may be practiced by various other software or hardware approaches.

Detailed Match

Figure 3:
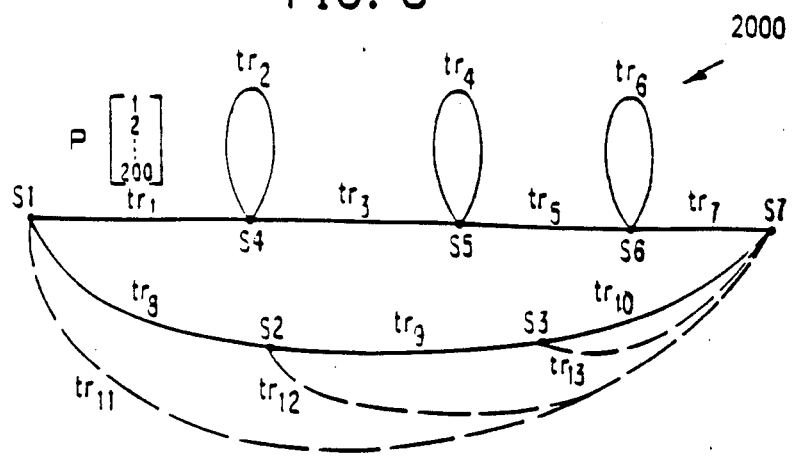
FIG. 3 is an illustration of a phonetic-type phone machine which is identified in storage and represented therein by statistics obtained during a training session.

In FIG. 3, a sample phonetic-type phone machine 2000 is depicted. Each phonetic-type match phone machine is a probabilistic finite-state machine characterized by (a) a plurality of states $S_i$, (b) a plurality of transitions $tr(S_j \rightarrow S_i)$, some of the transitions extending between different states and some extending from a state back to itself, each transition having associated therewith a corresponding probability, and (c) for each label that can be generated at a particular transition, a corresponding actual label probability.

In FIG. 3, seven states $S_1$ through $S_7$ are provided and thirteen transitions tr1 through tr13 are provided in the detailed match phone machine 2000. A review of FIG. 3 shows that phone machine 2000 has three transitions with dashed line paths, namely transitions tr11, tr12, and tr13. At each of these three transitions, the phone can change from one state to another without producing a label and such a transition is, accordingly, referred to as a null transition. Along transitions tr1 through tr10 labels can be produced. Specifically, along each transition tr1 through tr10, one or more labels may have a distinct probability of being generated thereat. Preferably, for each transition there is a probability associated with each label that can be generated in the system. That is, if there are two hundred labels that an be selectively generated by the acoustic channel, each transition (that is not a null) has two hundred "actual label probabilities" associated therewith—each of which corresponds to the probability that a corresponding label is generated by the phone at the particular transition. The actual label probabilities for transition tr1 are represented by the symbol p followed by the bracketed column of numerals 1 through 200, each numeral representing a given label. For label 1, there is a probability p [1] that the detailed phone machine 2000 generates the label 1 at transition tr1. The various actual label probabilities are stored with relation to the label and a corresponding transition.

When a string of labels $y_1 y_2 y_3$—is presented to a detailed match phone machine 2000 corresponding to a given phone, a match procedure is performed. The procedure associated with the detailed match phone machine is explained with reference to FIG. 14.

Figure 14:
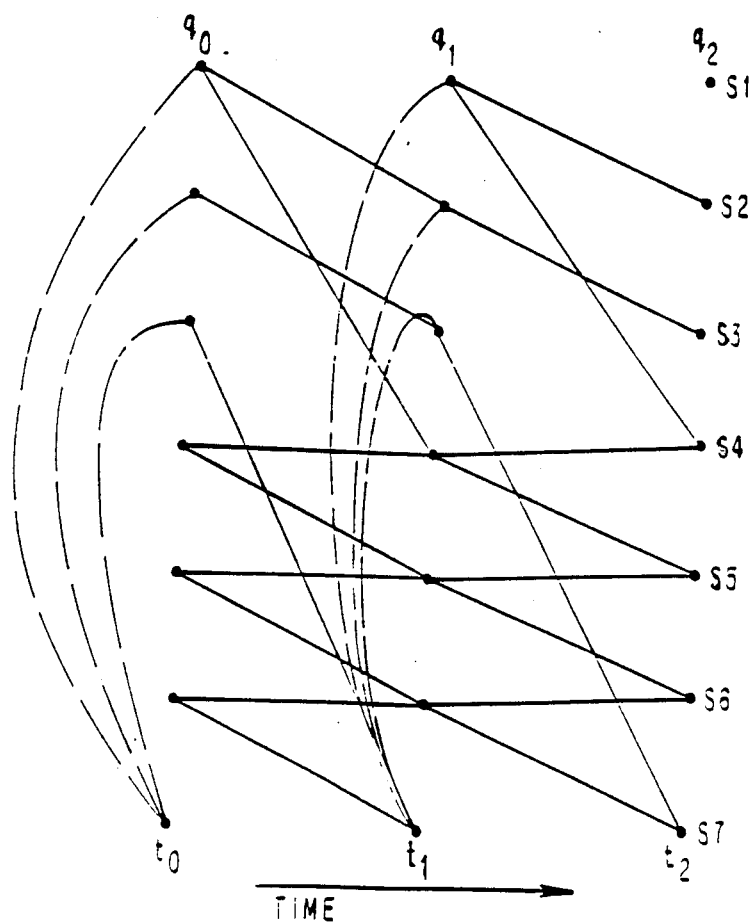
FIG. 14 is a trellis diagram, or lattice, of a detailed match procedure.

FIG. 14 is a trellis diagram of the phone machine 2000 of FIG. 3. As in the phone machine representation, the trellis diagram shows a null transition from state $S_1$ to state $S_7$ and transitions from state $S_1$ to state $S_2$ and from state $S_1$ to state $S_4$. The transitions between other states are also illustrated. The trellis diagram also shows time measured in the horizontal direction. Start-time probabilities $q_0$, $q_1$, and $q_2$ represent the probabilities that a phone has a start time at time $t=t_0$ or $t=t_1$ or $t=t_2$, respectively, for the phone. At each start time, the various transitions are shown. It should be noted, in this regard, that the interval between successive start (and end) times is preferably equal in length to the time interval of a label.

In employing the detailed match phone machine 2000 to determine how closely a given phone matches the labels of an incoming string, an end-time distribution for the phone is sought and used in determining a match value for the phone. In generating the end-time distribution to perform a detailed match, the detailed match phone machine 2000 involves computations which are exact and complicated.

Looking at the trellis diagram of FIG. 14, we first consider the computations required to have both a start time and end time at time $t=t_0$. For this to be the case according to the example phone machine structure set forth in FIG. 3, the following probability applies:

$$\begin{aligned} Pr(S_7, t = t_0) &= q_0 \times T(1 \to 7) \,+ \\ Pr(S_2, t = t_0) &\times T(2 \to 7) \,+ \\ Pr(S_3, t = t_0) &\times T(3 \to 7) \end{aligned} \quad (21)$$

where Pr represents "probability of" and T represents the transition probability between the two parenthetically identified states. The above equation indicates that the respective probabilities for the three conditions under which the end time can occur at time $t=t_0$ are limited in the current example to an end time occurrence at state $S_7$.

Looking next at the end time $t=t_1$, it is noted that a calculation relating to every state other than state $S_1$ must be made. The state $S_1$ starts at the end time of the previous phone. For purposes of explanation, only the calculations pertaining to state $S_4$ are set forth.

For state $S_4$, the calculation is:

$$\begin{aligned} Pr(S_4, t = t_1) &= Pr(S_1, t = t_0) \times T(1 \to 4) \times \\ Pr(y_1 | 1 \to 4) &+ Pr(S_4, t = t_0) \times T(4 \to 4) \times \\ Pr(y_1 | 4 \to 4) \end{aligned} \quad (22)$$

In words, the equation (22) set forth immediately above indicates that the probability of the phone machine being in state $S_4$ at time $t=t_1$ is dependent on the sum of the following two terms (a) the probability of being at state $S_1$ at time $t=t_0$ multiplied by the probability (T) of the transition from state $S_1$ to state $S_4$ multiplied further by the probability (Pr) of a given label $y_1$ in the string being generated given a transition from state $S_1$ and $S_4$ and (b) the probability of being at state $S_4$ at time $t=t_0$ multiplied by the probability of the transition from state $S_4$ to itself and further multiplied by the probability of generating the given label $y_1$ given the transition from state $S_4$ to itself.

Similarly, calculations pertaining to the other states (excluding state $S_1$) are also performed to generate corresponding probabilities that the phone is at a particular state at time $t=t_1$. Generally, in determining the probability of being at a subject state at a given time, the detailed match (a) recognizes each previous state that has a transition which leads to the subject state and the respective probability of each such previous state; (b) recognizes, for each such previous state, a value representing the probability of the label that must be generated at the transition between each such previous state and the current state in order to conform to the label string; and (c) combines the probability of each previous state and the respective value representing the label probability to provide a subject state probability over a corresponding transition. The overall probability of being at the subject state is determined from the subject state probabilities over all transitions leading thereto. The calculation of or state $S_7$, it is noted, includes terms relating to the three null transitions which permit the phone to start and end at time $t=t_1$ with the phone ending in state $S_7$.

As with the probability determinations relative to time $t=t_0$ and $t=t_1$, probability determinations for a series of other end times are preferably generated to form an end-time distribution. The value of the end-time distribution for a given phone provides an indication of how well the given phone matches the incoming labels.

In determining how well a word matches a string of incoming labels, the phones which represent the word are processed in sequence. Each phone generates an end-time distribution of probability values. A match value for the phone is obtained by summing up the end-time probabilities and then taking the logarithm of that sum. A start-time distribution for the next phone is derived by normalizing the end-time distribution by, for example, scaling each value thereof by dividing each value by the sum so that the sum of scaled values totals one.

It should be realized that there are at least two methods of determining h, the number of phones to be examined for a given word or word string. In a depth first method, computation is made along a baseform—computing a running subtotal with each successive phone. When the subtotal is found to be below a predefined threshold for a given phone position therealong, the computation terminates. Alternatively, in a breadth first method, a computation for similar phone positions in each word is made. The computations following the first phone in each word, the second phone in each word, and so on are made. In the breadth first method, the computations along the same number of phones for the various words are compared at the same relative phone positions therealong. In either method, the word(s) having the largest sum of match values is the sought object.

The detailed match has been implemented in APAL (Array Processor Assembly Language) which is the native assembler for the Floating Point Systems, Inc. 190L. In this regard, it should be recognized that the detailed match requires considerable memory for storing each of the actual label probabilities (i.e., the probability that a given phone generates a given label y at a given transition); the transition probabilities for each phone machine; and the probabilities of a given phone being at a given state at a given time after a defined start time. The above-noted FPS 190L is set up to make the various computations of end times, match values based on, preferably, the logarithmic sum of end time probabilities; start times based on the previously generated end time probabilities; and word match scores based on the match values for sequential phones in a word. In addition, the detailed match preferably accounts for "tail probabilities" in the matching procedure. A tail probability measures the likelihood of successive labels without regard to words. In a simple embodiment, a given tail probability corresponds to the likelihood of a label following another label. This likelihood is readily determined from strings of labels generated by, for example, some sample speech.

Hence, the detailed match provides sufficient storage to contain baseforms, statistics for the Markov models, and tail probabilities. For a 5000 word vocabulary where each word comprises approximately ten phones, the baseforms have a memory requirement of $5000 \times 10$. Where there are 70 distinct phones (with a Markov model for each phone) and 200 distinct labels and ten transitions at which any label has a probability of being produced, the statistics would require $70 \times 10 \times 200$ locations. However, it is preferred that the phone machines are divided into three portions—a start portion, a middle portion, and an end portion—with statistics corresponding thereto. (one of the three self-loops is preferably included in each portion). Accordingly, the storage requirements are reduced to $60 \times 2 \times 200$. With regard to the tail probabilities, $200 \times 200$ storage locations are needed. In this arrangement, 50K integer and 82K floating point storage performs satisfactorily.

The description above pertains to phonetic baseforms which comprise a sequence of phonetic phone machines like that shown in FIG. 3.

Figure 15:
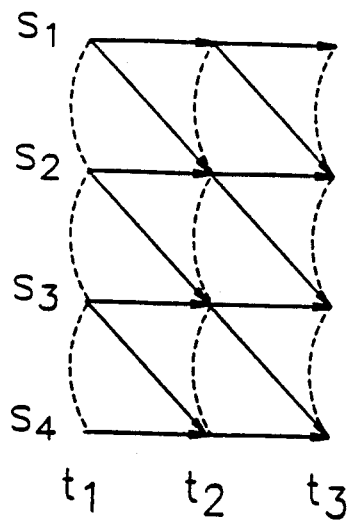
FIG. 15 is a diagram depicting a phone machine used in performing matching.
Figure 21:
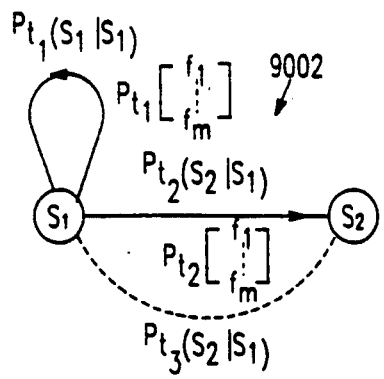
FIG. 21 is an illustration of a sample fenemic phone machine.

In addition, however, a fenemic baseform may also be employed in a detailed match similar to that outlined above. FIG. 15 shows a lattice based on fenemic phone machines (an example of which is shown in FIG. 21). It is noted that at any given time, any of three transitions may occur. A null transition (with a dash representation) proceeds from a state to another without any label being generated. A second transition provides for a label to be produced during a self-loop from a state to itself. The third transition provides for a label to be produced in a transition proceeding from a state to another.

As suggested above, a fast match—although shown in FIG. 1—is optional. The discussion below relates to an environment which includes a fast match that reduces the number of words to be examined by the detailed match. However, it is noted that the fast match may be omitted, if desired—each word then being processed by the detailed match.

Phone Tree Structure

Figure 16:
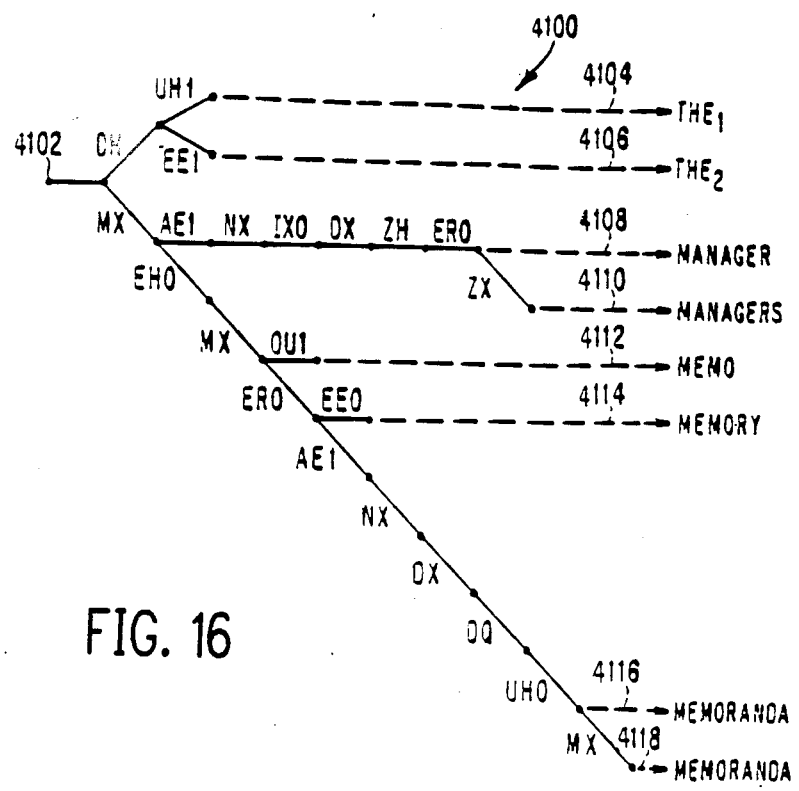
FIG. 16 is a diagram illustrating a tree structure of phones which permit processing of multiple words simultaneously.

The phone match values, once determined, are compared along the branches of a tree structure 4100 as shown in FIG. 16 to determine which paths of phones are most probable. In FIG. 16, the phone match values for DH and UH1 (emanating from point 4102 to branch 4104) should sum to a much higher value for the spoken word "the" than the various sequences of phones branching from the phone MX. In this regard, it should be observed that the phone match value of the first MX phone is computed only once and then used for each baseform extending therefrom. (See branches 4104 and 4106). In addition, when the total score calculated along a first sequence of branches is found to be much lower than a threshold value or much lower than the total score for other sequences of branches, all baseforms extending from the first sequence may be simultaneously eliminated as candidate words. For example, baseforms associated with branches 4108 through 4118 are simultaneously discarded when it is determined that MX is not a likely path. With the fast match embodiments and the tree structure, an ordered list of candidate words is generated with great computational savings.

With regard to storage requirements, it is noted that the tree structure of phones, the statistics for the phones, and tail probabilities are to be stored. With regard to the tree structure, there are 25,000 arcs and four datawords characterizing each arc. The first dataword represents an index to successor arcs or phones. The second dataword indicates the number of successor phones along the branch. The third dataword indicates at which node in the tree the arc is located. And the fourth dataword indicates the current phone. Hence, for the tree structure, $25,000 \times 4$ storage spaces are required. In the fast match, there are 100 distinct phones and 200 distinct fenemes. In that a feneme has a single probability of being produced anywhere in a phone, storage for $100 \times 200$ statistical probabilities is required. Finally, for the tail probabilities, $200 \times 200$ storage spaces are required. 100K integer and 60K floating point storage is sufficient for the fast match.

Language Model

As noted previously, a language model which stores information—such as tri-grams—relating to words in context may be included to enhance the probability of a correct word selection. Language models have been reported in the literature.

The language model 1010, preferably, has a unique character. Specifically, a modified tri-gram method is used. In accordance with this method, a sample text is examined to determine the likelihood of each ordered triplet of words, ordered pair of words, and single word in the vocabulary. A list of the most likely triplets of words and a list of the most likely pairs of words are formed. Moreover, the likelihood of a triplet not being in the triplet list and the likelihood of a pair not being in the pair list are respectively determined.

In accordance with the language model, when a subject word follows two words, a determination is made as to whether the subject word and the two preceding words are on the triplet list. If so, the stored probability assigned to the triplet is indicated. If the subject word and its two predecessors are not on the triplet list, a determination is made as to whether the subject word and its adjacent predecessor are on the pair list. If so, the probability of the pair is multiplied by the probability of a triplet not being on the triplet list, the product then being assigned to the subject word. If the subject word and its predecessor(s) are not on the triplet list or pair list, the probability of the subject word alone is multiplied by the likelihood of a triplet not being on the triplet list and by the probability of a pair not being on the pair list. The product is then assigned to the subject word.

Training With Approximations

Figure 17:
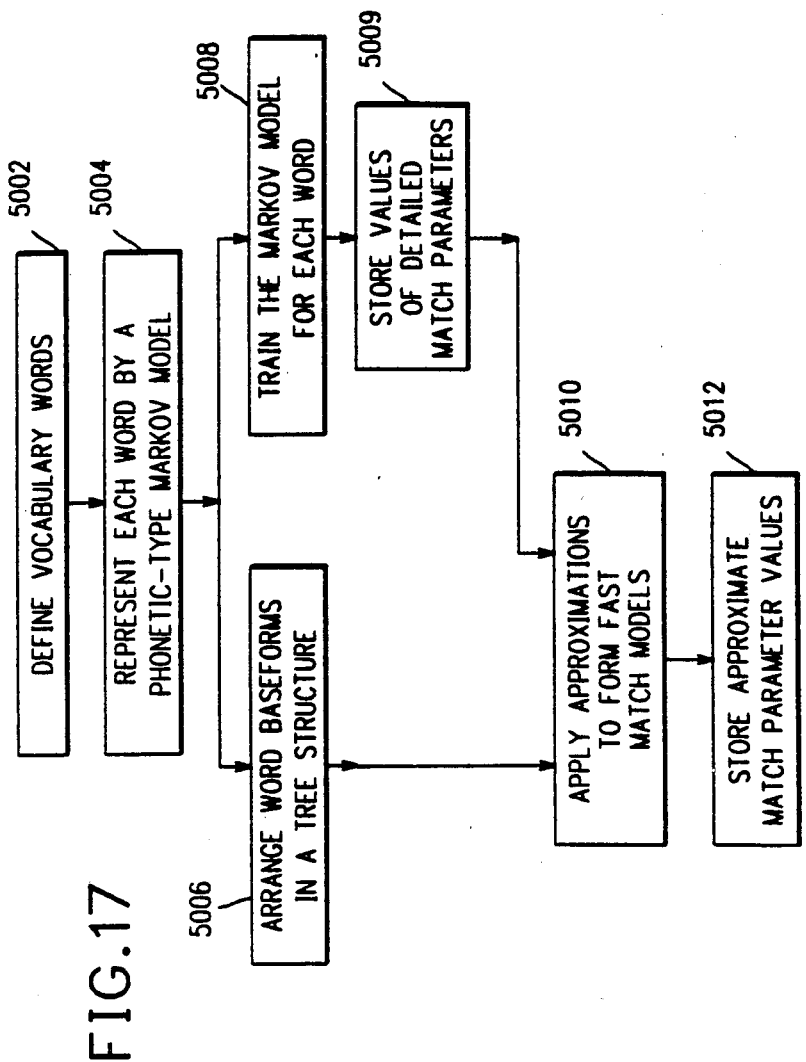
FIG. 17 is a flowchart showing steps followed in training Markow Model phone machines.

Referring to FIG. 17, a flowchart 5000 illustrating the training of phone machines employed in acoustic matching is shown. At step 5002, a vocabulary of words—typically on the order of 5000 words—is defined. Each word is then represented by a sequence of phone machines. The phone machines have, by way of example, been shown as phonetic-type phone machines but may, alternatively, comprise a sequence of fenemic phones. Representing words by a sequence of phonetic-type phone machines or by a sequence of fenemic phone machines is discussed hereinbelow. A phone machine sequence for a word is referred to as a word baseform.

In step 5006, the word baseforms are arranged in the tree structure described hereinabove. The statistics for each phone machine in each word baseforms are determined by training according to the well-known forward-backward algorithm set forth in the artile "Continuous Speech Recognition by Statistical Methods" by F. Jelinek.

At step 5009, values to be used in the detailed match are stored. In step 5010, approximations corresponding to a fast match procedure are applied to the various models. The approximations may relate top substituting actual statistics with approximate statistics and/or limiting the number of labels examined in the matching.

Approximate parameter values to be employed in a fast match are set in step 5012. At this time, each phone machine in each word baseform has been trained with the desired approximations. Moreover, the detailed match phone machines are also defined. Acoustic matching by means of the detailed match alone or in conjunction with the fast match can be performed—the phones along respective word baseforms being examined along the paths of the tree structure.

Extending Word Paths with Words Selected by Acoustic Matching

The preferred stack decoding methodology used in the speech recognition system of FIG. 1 is now described.

In FIG. 4 and FIG. 5, a plurality of successive labels $y_1$—are shown generated at successive "label intervals", or "label positions".

Also, shown in FIG. 5, are a plurality of some generated word paths, namely path A, path B, and path C. In the context of FIG. 4, path A could correspond to the entry "to be or", path B to the the entry "two b", and path C to the entry "too". For a subject word path, there is a label (or equivalently a label interval) at which the subject word path has the highest probability of having ended—such label being referred to as a "boundary label".

For a word path W representing a sequence of words, a most likely end time—represented in the label string as a "boundary label" between two words—can be found by known methods such as that described in an article entitled "Faster Acoustic Match Computation" (by L. R. Bahl, F. Jelinek, and R. L. Mercer) in the *IBM Technical Disclosure Bulletin*, volume 23, number 4, September 1980. Briefly, the article discusses methodology for addressing two similar concerns: (a) how much of a label string Y is accounted for by a word (or word sequence) and (b) a which label interval does a partial sentence—corresponding to a part of the label string—end.

For any given word path, there is a "likelihood value" associated with each label or label interval, including the first label of the label string through to the boundary label. Taken together, all of the likelihood values for a given word path represent a "likelihood vector" for the given word path. Accordingly, for each word path there is a corresponding likelihood vector. Likelihood values $L_t$ are illustrated in FIG. 5.

A "likelihood envelope" $\Lambda_t$ at a label interval t for a collection of word paths $W^1$, $W^2$, ... $W^s$ is defined mathematically as:

$$\Lambda_t = max(L_t(W^1), \cdots, L_t(W^2))$$

That is, for each label interval, the likelihood envelope includes the highest likelihood value associated with any word path in the collection. A likelihood envelope 8040 is illustrated in FIG. 5.

A word path is considered "complete" if it corresponds to a complete sentence. A complete path is preferably identified by a speaker entering an input, e.g. pressing a button, when he reaches the end of a sentence. The entered input is synchronized with a label interval to mark a sentence end. A complete word path cannot be extended by apending any words thereto. A "partial" word path corresponds to an incomplete sentence and can be extended.

Partial paths are classified as "live" or "dead". A word path is "dead" if it has already been extended and "live" if it has not. With this classification, a path which has already been extended to form one or more longer extended word paths is not reconsidered for extension at a subsequent time.

Each word path is also characterizable as "good" or "bad" relative to the likelihood envelope. The word path is good if, at the label corresponding to the boundary label thereof, the word path has a likelihood value which is with in of the maximum likelihood envelope. Otherwise, the word path is marked as "bad". Preferably, but not necessarily, is a fixed value by which each value of the maximum likelihood envelope is reduced to serve as a good/bad threshold level.

For each label interval there is a stack element. Each live word path is assigned to the stack element corresponding to the label interval that corresponds to the boundary label of such a live path. A stack element may have zero, one, or more word path entries—the entries being listed in order of likelihood value.

The steps performed by the stack decoder 1002 of FIG. 1 are not discussed.

Forming the likelihood envelope and determining which word paths are "good" are interrelated as suggested by the sample flowchart of FIG. 6.

In the flowchart of FIG. 6, a null path is first entered into the first stack(0) in step 8050. A stack (complete) element is provided which contains complete paths, if any, which have been previously determined (step 8052). Each complete path in the stack (complete) element has a likelihood vector associated therewith. The likelihood vector of the complete path having the highest likelihood at the boundary label thereof initially defines the maximum likelihood envelope. If there is no complete path in the stack (complete) element, the maximum likelihood envelope is initialized as $-\infty$ at each label interval. Moreover, if complete paths are not specified, the maximum likelihood envelope may be initialized at $-\infty$. Initializing the envelope is depicted by steps 8054 and 8056.

After the maximum likelihood envelope is initialized, it is reduced by a predefined amount to form a $\Delta$-good region above the reduced likelihoods and a $\Delta$-bad region below the reduced likelihoods. The value of $\Delta$ controls the breadth of the search. The larger $\Delta$ is, the larger the number of word paths that are considered for possible extension. When $\log_{10}$ is used for determining $L_t$, a value of 2.0 for $\Delta$ provides satisfactory results. The value of Δ is preferably, but not necessarily, uniform along the length of label intervals.

If a word path has a likelihood at the boundary label thereof which is in the Δ-good region, the word path is marked "good". Otherwise, the word path is marked "bad".

As shown in FIG. 6, a loop for updating the likelihood envelope and for marking word paths s "good" (for possible extension) or "bad" starts with the finding of the longest unmarked word path (step 5058). If more than one unmarked word path is in the stack corresponding to the longest word path length, the word path having the highest likelihood at the boundary label thereof is selected. If a word path is found, it is marked as "good" if the likelihood at the boundary label thereof lies within the Δ-good region or "bad" otherwise (step 8060). If the word path is marked "bad" (step 8062), another unmarked live path is found and marked. If the word path is marked "good", the likelihood envelope is updated to include the likelihood values of the path marked "good". That is, for each label interval, an updated likelihood value is determined as the greater likelihood value between (a) the present likelihood value in the likelihood envelope and (b) the likelihood value associated with word path marked "good". This is illustrated by steps 8064 and 8066. After the envelope is updated, a longest best unmarked live word path is again found (step 8058).

The loop is then repeated until no unmarked word paths remain. At that time, the shortest word path marked "good" is selected. If there is more than one word "good" path having a shortest length, the one having the highest likelihood at the boundary label thereof is selected (step 8070). The selected shortest path is then subjected to extension. That is, at least one likely follower word is determined as indicated above by preferably performing the fast match, language model, detailed match, and langugage model procedure. For each likely follower word, an extended word path is formed. Specifically, an extended word path is formed by appending a likely follower word on the end of the selected shortest word path.

After the selected shortest word path is formed into extended word paths, the selected word path is removed from the stack in which it was an entry and each extended word path is entered into the appropriate stack therefor. In particular, an extended word path becomes an entry into the stack corresponding to the boundary label of the extended word path step 8072.

With regard to step 8072, the action of extending the chosen path is now discussed with reference to the flowchart of FIG. 18.

Figure 18:
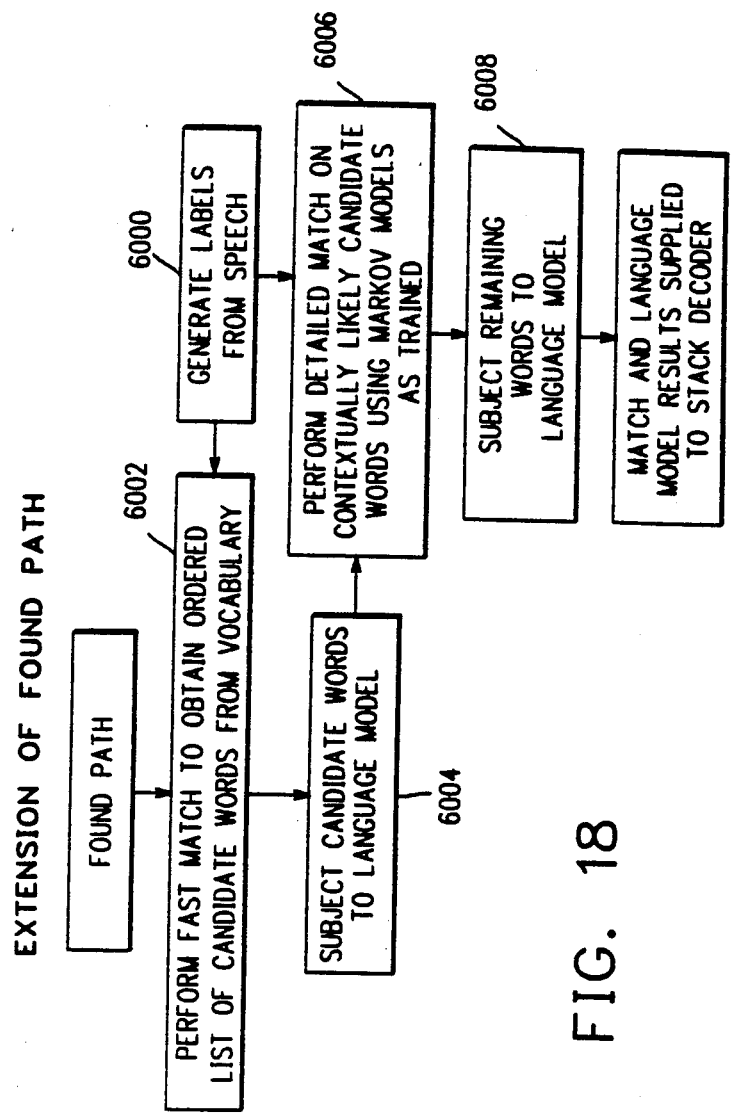
FIG. 18 is a flowchart showing steps followed in extending word paths.

In accordance with FIG. 18, at step 6000, the acoustic processor 1002 (of FIG. 1) generates a string of labels. The string of labels is provided as input to enable step 6002 to be performed. In step 6002 the basic or one of the enhanced approximate matching procedures is performed to obtain an ordered list of candidate words. Thereafter, a language model (as described hereinabove) is applied in step 6004 as described hereinabove. The subject words remaining after the language model is applied are entered together with the generated labels in a detailed match processor which performs step 6006. The detailed match results in a list of remaining candidate words which are preferably subjected to the language model in step 6008. The likely words—as determined by the approximate match, detailed match, and langugage model—are used for extension of the path found in step 8070 of FIG. 6. Each of the likely words determined at step 6008 (FIG. 18) are separately appended to the found word path so that a plurality of extended word paths may be formed.

Referring again to FIG. 6, after the extended paths are formed and the stacks are re-formed, the process repeats by returning to step 8052.

Each iteration thus consists of selecting the shortest best "good" word path and extending it. A word path marked "bad" on one iteration may become "good" on a later iteration. The characterization of a live word path as "good" or "bad" is thus made independently on each iteration. In practice, the likelihood envelope does not change greatly from one iteration to the next and the computation to decide whether a word path is "good" or "bad" is done efficiently. Moreover, normalization is not required.

When complete sentences are identified, step 5074 is preferably included. That is, when no live word paths remain unmarked and there are no "good" word paths to be extended, decoding is finished. The complete word path having the highest likelihood at the respective boundary label thereof is identified as the most likely word sequence for the input label string.

In the case of continuous speech where sentence endings are not identified, path extension proceeds continually or for a predefined number of words as preferred by the system user.

II. Constructing Markov Models for Words from Multiple Utterances

Referring to the flowchart of FIG. 19, steps in constructing a basic baseform are outlined. A "baseform", it is recalled, is a sequence of phone machines representing a word segment (preferably a word) found in the vocabulary of a speech recognition system. A word segment is preferably a dictionary word but may also refer to a predefined portion of a dictionary word such as a syllable of a dictionary word.

An initial step (9000) of the FIG. 19 embodiment of the invention is to transform utterances of the word segment into strings of fenemes (or labels). As discussed hereinbefore, an acoustic processor typically generates a string of fenemes in response to the utterance of a word segment. For each utterance, there is a corresponding feneme string.

Figure 20:
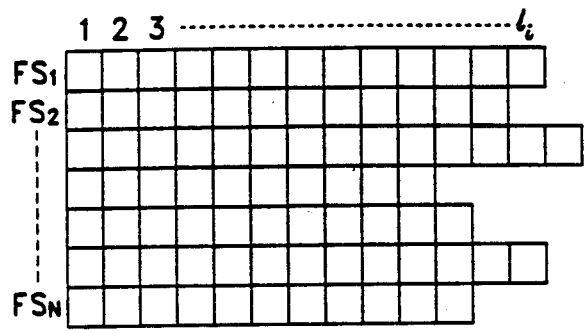
FIG. 20 is an illustration showing feneme sequences obtained from N utterances of a single word segment.

FIG. 20 shows N feneme strings $FS_1$ through $FS_N$, each being generated in response to a corresponding utterance of a given word segment. Each block represents a feneme in a string. The fenemes are identified as fenemes 1 through $1_i$ in each string.

In accordance with the invention, a set of phone machines (or Markov models) is defined. Each phone machine is characterized by at least two states; transitions, each of which extends from a state to a state; a probability associated with each transition; and, for at least some transitions, a plurality of output probabilities, each output probability corresponding to the likelihood of producing a given feneme at a particular transition. A simple sample fenemic phone machine 9002 is illustrated in FIG. 21.

Phone machine 9002 has states $S_1$ and $S_2$. One transition $t_1$ extends from state $S_1$ to itself and has a probability of $P_{t1}(S_1|S_1)$. For transition $t_1$, there is a respective probability associated with producing each feneme $f_1$ through feneme $f_m$ at transition $t_1$. Similarly, transition $t_2$ between states $S_1$ and $S_2$ has (a) a probability associated therewith $P_{t2}(S_2|S_1)$ and (b) a respective probability for producing each feneme $f_1$ through feneme $f_m$. A null transition $t_3$ represents a transition where no output, i.e., no feneme, is produced. The null transition has a probability $P_{t3}(S_2|S_1)$ associated therewith. The phone machine 9002 permits any number of fenemes to be produced thereby—as where transition $t_1$ repeats—and, alternatively, permits no fenemes to be produced when transition $t_3$ is followed.

Each phone machine has different probabilities or statistics associated therewith. Preferably, but not necessarily, the phone machines in the set have the same configuration and differ only in the statistics. The statistics are typically determined during a training session.

With the set of phone machines defined, a determination is made as to which phone machine provides the best baseform of phone length 1 when applied to all the feneme strings generated by utterance of a given word segment (step 9004). The best baseform of phone length 1 (referred to as $P_1$) is found by examining each phone machine in the set and, for each phone, determining the probability of producing each feneme string $FS_1$ through $FS_N$. The N probabilities derived for each particular phone machine are multiplied together to yield a joint probability assigned to the particular phone machine. The phone machine having the highest joint probability is selected as the best baseform $P_1$ of length 1.

Keeping phone $P_1$, the best baseform of length 2 having the form of $P_1P_2$ or $P_2P_1$ is sought. That is, each phone is appended at the end of $P_1$ to form a respective ordered pair of phones and each phone is appended to the front of $P_1$ to form a respective ordered pair. A joint probability for each ordered pair of phones is derived. The ordered pair having the highest joint probability of producing the feneme strings is considered the best baseform of length 2 (step 9006).

The best baseform of length 2, i.e., the ordered pair of highest joint probability, is then subjected to alignment (step 9008), such as the well-known Viterbi alignment. Briefly, the alignment indicates which fenemes in each string correspond to each phone of the ordered pair. (At this point it is noted that a phone is that which is represented by a phone machine. Hence, the terms phone and phone machine refer to corresponding entities.)

Following alignment, a consistent point is located in each feneme string $FS_1$ through $FS_N$. For each feneme string $FS_1$ through $FS_N$, the consistent point is defined as the most probable point where phones $P_1$ and $P_2$ (of the best baseform of length 2) meet. Alternatively, the consistent point may be viewed as the point where each feneme string $FS_1$ through $FS_N$ is divided into a left portion and a right portion wherein the left portions of all feneme strings represent a common set of sounds and wherein the right portions of all feneme strings represent a common set of sounds (step 9010).

Each left portion is considered a left substring and each right portion is considered a right substring (step 9012).

The left substrings and the right substrings are then treated separately, but similarly, applying a divide-and-conquer approach.

For the left substrings, the best single phone baseform $P_L$ having the highest joint probability therefor is found (step 9014). Keeping the phone $P_L$, each phone in the set is appended therebefore to form an ordered pair and thereafter to form an ordered pair. The ordered pair $P_LP_A$ or $P_AP_L$ having the highest joint probability of producing the fenemes in the left substring is then found (step 9016). As suggested previously, this is considered the best baseform of length 2 for the left substrings.

The joint probability of the best baseform of length 2 for the left substrings is compared to the joint probability of $P_L$ alone (step 9018). If the $P_L$ joint probability is greater, the phone $P_L$ is positioned in a concatenated baseform (step 9020). If the $P_L$ joint probability is less, $P_LP_A$ or $P_AP_L$ is aligned against the left substrings (step 9022). A consistent point in each of the left substrings is located and each left substring is split thereat into a (new) left portion and a (new) right portion (step 9024).

The same procedure is also applied to the each right substring of the initially split feneme strings $FS_1$ through $FS_N$. A single best baseform $P_R$ (from step 9030) is compared in step 9032 against the best baseform $P_RP_B$ or $P_BP_R$ of length 2 found in step 9034. If the joint probability of $P_R$ is greater, the phone $P_R$ is positioned in the concatenated baseform (step 9020). Otherwise, alignment is performed and each right substring is split at the consistent point thereof (step 9036).

The division cycle is repeated for each substring wherein the best baseform of length 2 has a higher joint probability than the best single phone baseform. That is, a substring may be divided into two portions, either or both of which may—after alignment—comprise a new substring that, in turn, may be divided and so on until only single phone baseforms remain.

The single phone baseforms are concatenated in the same order as the substrings they represent. The concatenated baseform represents successive single phones that correspond to successive substrings of the feneme strings $FS_1$ through $FS_N$. As noted hereinafter, a substring may include zero, one, or more fenemes—thereby accounting for variations in pronunciation from one utterance to the next.

Figure 22:
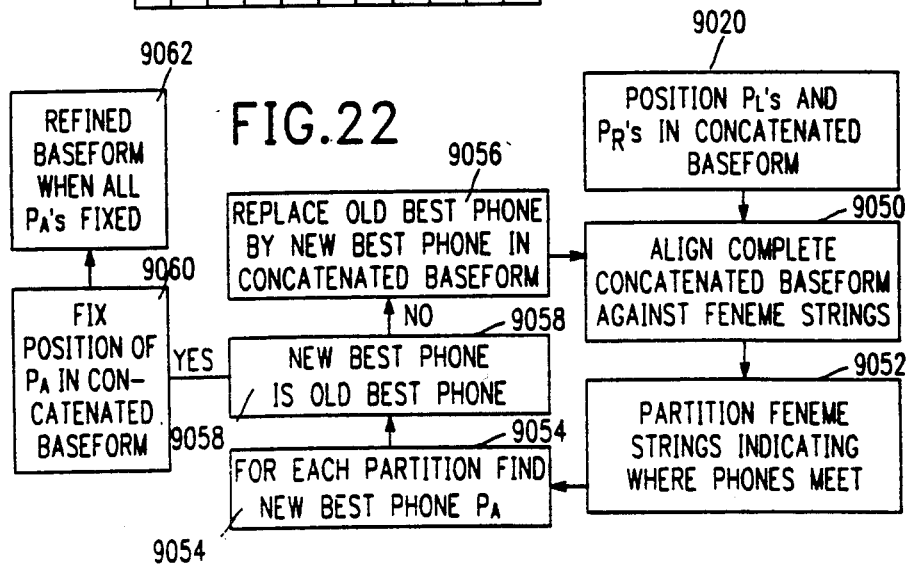
FIG. 22 is a flowchart which adds to the flowchart of FIG. 19 to provide an enhanced baseform for a word segment.

The above-described concatenated baseform represents a basic baseform of a word segment, e.g. a vocabulary word. A refinement of the concatenated baseform is embodied in the flowchart of FIG. 22. FIG. 22 extends from the last step of the FIG. 19 flowchart, continuing from the step of positioning single phones ($P_L$ and $P_R$) to form a concatenated baseform (step 9020). According to the refinement, the concatenated baseform is aligned against the feneme strings (step 9050). For each feneme string $FS_1$ through $FS_N$, the alignment indicates which (if any) fenemes in the string correspond to a respective phone machine, the alignment serving to partition the string based on phone correspondence (step 9052).

An analysis of each partitioned section is undertaken to determine the best single phone for the partition (step 9054). Because of the alignment, the best single phone for fenemes in a partitioned section may differ from the single phone in the previously aligned concatenated baseform.

Each best single phone replaces the corresponding single phone in the previously aligned concatenated baseform (step 9056) if the two differ in step (9058), thereby generating a new concatenated baseform. The new baseform is then, if desired, subject to alignment (step 9050), partition (9052), finding a new best phone (step 9054), and replacement of phones in the concatenated baseform as appropriate (step 9056). As indicated in the FIG. 22 flowchart, this cycle can be repeated in order to derive successively processed baseforms.

If the old best phone in the concatenated baseform is the same as the new best phone for a given partition (step 9058), the phone is fixed in position in the concatenated baseform (step 9060). When all phones are fixed in their respective ordered positions, a refined baseform results (step 9062).

A specific description of a fenemic baseform is now provided with reference to FIGS. 23 through 26. $P_1$ is initially found to be the best baseform of length 1 for the feneme strings $FS_1$ through $FS_N$.

Figure 23:
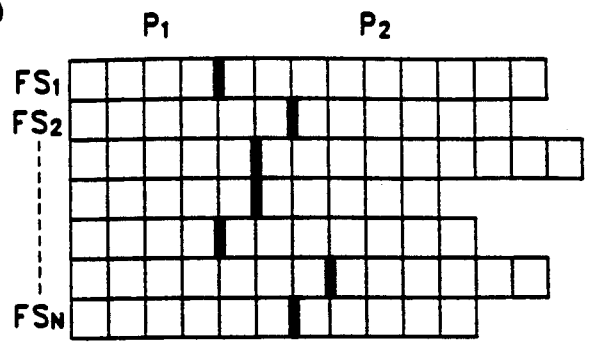
FIG. 23 is an illustration showing a best baseform of phone length 2 as applied to each feneme string generated in response to one of multiple utterances.
Figure 24:
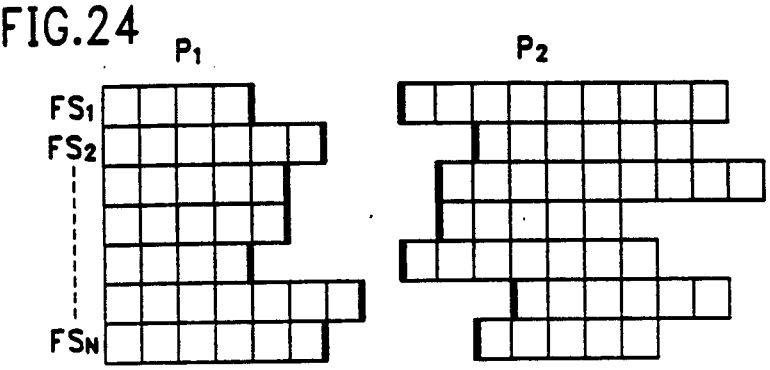
FIG. 24 is an illustration showing each feneme string split at a consistent point defined as the point at which phone $P_1$ meets phone $P_2$.
Figure 25:
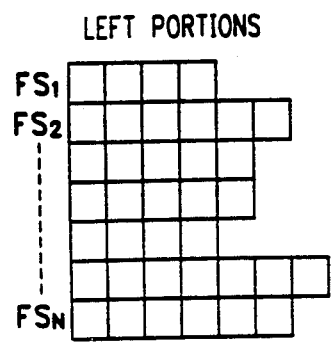
FIG. 25 is an illustration showing the split parts being identified as a left portion and a right portion.

Using $P_1$ as one phone, a second phone is determined to form the best ordered pair of phones for the feneme strings $FS_1$ through $FS_N$. This is shown in FIG. 23. In FIG. 24, each feneme string $FS_1$ through $FS_N$ is split at the point where phone $P_1$ most likely meets phone $P_2$. In FIG. 25, left portions and right portions are defined which are then separately examined as were the multiple feneme strings of FIG. 23. With successive divide-and-conquer steps, the fenemes in each string are represented by successively more phones. When the probability of a given phone exceeds the probability of the two phones derived therefrom, splitting stops and the given phone is entered into a respective position along a sequence of such unsplit phones.

Figure 26:
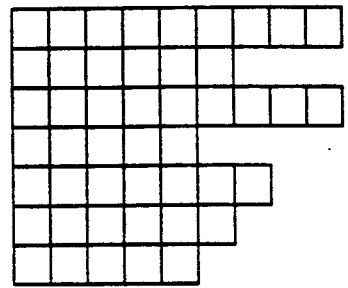
FIG. 26 is an illustration showing a phone and the corresponding portion of each feneme string $FS_1$ through $FS_N$.

FIG. 26 provides a sample of an entered single phone $P_1$, indicating the substrings of feneme strings $FS_1$ through $FS_N$ corresponding thereto. In $FS_1$, phone $P_1$ is associated with a single feneme; in $FS_2$, $P_1$ is associated with a null; in $FS_3$, $P_1$ is associated with producing two fenemes; and so on.

To refine the baseform, a Viterbi alignment of each utterance's feneme string against the concatenated baseform is performed. For each phone in turn in the concatenated baseform, the fenemes aligned thereagainst are determined. If there are none, the phone is deleted. Otherwise, the phone which maximizes the probability of producing the fenemes aligned therewith (i.e., in the partitioned section therefor) is found and replaces an earlier phone, if the earlier phone is less likely than the maximum probability phone. The steps may or may not be repeated as desired. If repeated, the repetition ends when no phones are replaced.

The present invention has been implemented in PL/I on an MVS IBM 3084 system but may be implemented in any of various languages on any of various computing systems.

In addition to the variations and modifications to applicant's disclosed apparatus which have been suggested, many other variations and modifications will be apparent to those skilled in the art, and accordingly, the scope of applicant's invention is not to be contrued to be limited to the particular embodiments shown or suggested.

For example, the best baseform has been characterized as that baseform with the highest joint probability where joint probability has been, according to the discussed embodiment, the product of probabilities associated with each feneme string. The best baseform and highest joint probability may be defined otherwise in accordance with the invention. In this regard, highest mean probability or some predefined distribution may be applied in determining the highest joint probability.

Moreover, the invention may be practiced by splitting into more than two partitioned portions at a time. For example, the feneme string for each utterance may initially be divided into three partitioned sections—a left section, a middle section, and a right section. Each partitioned section would then be examined separately by further divided-and-conquer steps. The splitting into two, rather than more, partitioned sections is however, preferred.

It should also be observed that the order of splitting and aligning is not a fixed limitation. In one embodiment, splitting and aligning are performed to define successively smaller left portions until the splitting stops. A leftmost phone in a concatenated baseform is thereby first determined. Thereafter, the second phone from the left in the concatenated baseform is defined. Alternatively, the invention contemplates other sequences of splitting and aligning to arrive at the desired phones in the concatenated baseform.

We claim:

1. In a speech recognition system having an acoustic processor, a method of processing multiple utterances of a word in the construction of a fenemic baseform for the word, the method comprising the steps of:
    (a) providing as input a string of fenemes generated by the acoustic processor in response to an utterance of the word;
    (b) repeating step (a) for each utterance of the multiple utterances; and
    (c) locating a consistent point in each input string of fenemes, wherein each string of fenemes is divided by the consistent point thereof into a left portion and a right portion (i) each of the left portions corresponding to a first sound-representing model in a set of sound-representing models and (ii) each of the right portions corresponding to a second sound-representing model in the set of sound-representing models.

2. The method of claim 1 wherein said consistent point locating step comprises the steps of:
    (d) storing a set of fenemic phone machines, each phone machine having (i) a plurality of states; (ii) transitions between states, each transition having a probability associated therewith; and (iii), for at least some transitions, a respective probability of producing each feneme at a given transition; and
    (e) determining the probability of a phone machine producing each of the input feneme strings;
    (f) repeating step (e) for each phone machine; and
    (g) selecting the phone machine that has the highest joint probability of producing the input feneme strings.

3. The method of claim 2 wherein said consistent point locating step comprises the further steps of:
    (h) appending a phone machine in front of the selected phonemachine to form an ordered pair of phone machines and determining the probability of the ordered pair of phone machines producing each of the input strings of fenemes;
    (j) repeating step (h) for each phone machine as the appended phone machine;
    (k) appending a phone machine at the end of the selected phone machine to form an ordered pair of phone machines and determining the probability of the ordered pair of phone machines producing each of the input strings of fenemes;
    (l) repeating step (k) for each phone machine as the appended phone machine;
    (m) selecting the ordered pair of the appended phone machine and the selected phone machine that has the highest joint probability of producing the input strings of fenemes.

4. The method of claim 3 wherein said consistent point locating step comprises the further step of:
    (n) performing an alignment process between the selected ordered pair of phone machines and each input string of fenemes, the most probable point in each string where the two phone machines meet being the consistent point.

5. The method of claim 4 comprising the further steps of:
   (p) splitting the left portion from the right portion of each input string of fenemes at the respective consistent point thereof;
   (q) finding the single phone $P_L$ having the highest joint probability for the left portions of the input strings;
   (r) finding the two phone baseform, from among all two phone baseforms that include the phone $P_L$, which has the highest joint probability of producing the left portions;
   (s) if the highest probability two phone baseform including phone $P_L$ is higher than the probability associated with the single phone $P_L$, (i) aligning each utterance against the found two phone baseform and (ii) splitting the found two phone baseform apart at the point of meeting into a resultant left portion and a resultant right portion; and
   (t) performing steps (p) through (s) with the resultant left portion and the resultant right portion being substituted for the left portion and the right portion respectively.

6. The method of claim 5 comprising the further steps of:
   (u) discontinuing the splitting when a highest probability single phone machine has a higher probability than any two phone baseform that includes the highest probability single phone and an appended phone; and
   (v) concatenating the unsplit single phones; the concatenated baseform forming a basic baseform of the word.

7. The method of claim 6 comprising the further steps of:
   (w) aligning each input string of fenemes against the baseform of concatenated single phones; and
   (x) for a phone in the concatenated baseform, determining the fenemes which are aligned thereagainst and either (i) if there are no aligned fenemes, deleting the phone from the concatenated baseform or (ii) finding the phone which maximizes the probability of producing the determined fenemes and replacing the phone in the concatenated baseform by the found phone if they differ; and
   (y) repeating step (x) for each phone in the concatenated baseform.

8. The method of claim 7 comprising the further step of:
   (z) repeating steps (w), (x), and (y) until each phone in the concatenated sequence has the maximum probability of producing the fenemes aligned therewith; the baseform resulting from step (z) being a refined baseform for the word.

9. A speech recognition method using a speech input subsystem which converts utterances to feneme strings and a computer, the method being characterized by the steps of:
   (a) finding a best first baseform of phone length one which maximizes the joint probability of producing the feneme strings resulting from multiple utterances of a given word in a vocabulary of words;
   (b) finding a best second baseform of phone length two and of the form either (i) $P_1P_2$ or (ii) $P_2P_1$ which has a higher joint probability than any other baseform of length two;
   (c) comparing the joint probability of the first baseform with the joint probability of the second baseform and, if the second baseform joint probability is higher than the joint probability of the first baseform, splitting each feneme string into a left portion and a right portion at the point which maximizes the probability that the left portion is produced by the left phone and the right portion is produced by the right phone;
   (d) repeating steps (a) through (c) until all baseforms are of single phone length and no second baseform has a higher probability than its respective first baseform; and
   (e) concatenating the baseforms of phone length one remaining after step (d) to form a basic fenemic baseform of the entire word.

10. The method of claim 9 comprising the further step of:
    (f) aligning the concatenated baseform against the feneme strings using the Viterbi algorithm and identifying a feneme substring in each string corresponding to each phone in the concatenated baseform; and
    (g) determining after alignment, for each phone in the concatenated baseform, any other phone in the set having a higher joint probability of producing the feneme substrings corresponding thereto in the multiple feneme strings.

11. A method of constructing a fenemic baseform for a word in a vocabulary of word segments, the method comprising the steps of:
    (a) transforming multiple utterances of the word into respective strings of fenemes;
    (b) defining a set of fenemic Markov model phone machines;
    (c) determining the best single phone machine $P_1$ for producing the multiple feneme strings;
    (d) determining the best two phone baseform of the form $P_1P_2$ or $P_2P_1$ for producing the multiple feneme strings;
    (e) aligning the best two phone baseform against each feneme string;
    (f) splitting each feneme string into a left portion and a right portion with the left portion corresponding to the first phone machine of the two phone baseform and the right portion corresponding to the second phone machine of the two phone baseform;
    (g) identifying each left portion as a left substring and each right portion as a right substring;
    (h) processing the set of left substrings in the same manner as the set of feneme strings corresponding to the multiple utterances, including the further step of inhibiting splitting of a substring when the single phone baseform thereof has a higher probability of producing the substring than does the best two phone baseform;
    (j) processing the set of right substrings in the same manner as the set of feneme strings corresponding to the multiple utterances, including the further step of inhibiting splitting of a substring when the single phone baseform thereof has a higher probability of producing the substring than does the best two phone baseform; and
    (k) concatenating the unsplit single phones in an order corresponding the order of the feneme substrings to which they correspond.

12. The method of claim 11 comprising the further steps of:

(l) aligning the concatenated baseform against each of the feneme strings and identifying, for each phone in the concatenated baseform, the substring in each feneme string which corresponds thereto, the substrings corresponding to a given phone being a set of common substrings;

(m) for each set of common substrings, determining the phone machine having the highest joint probability of producing the common substrings; and (n) for each common substring, replacing the phone therefor in the concatenated baseform by the determined phone of highest joint probability; the baseform resulting from the replacing of phones being a refined baseform.

13. The method of claim 12 comprising the further step of:

(o) repeating steps (l) through (n) until no phones are replaced.

* * * * *